United States Patent
Wackerly et al.

(10) Patent No.: US 10,623,339 B2
(45) Date of Patent: *Apr. 14, 2020

(54) REDUCED ORTHOGONAL NETWORK POLICY SET SELECTION

(71) Applicant: Hewlett Packard Enterprise Development LP, Houston, TX (US)

(72) Inventors: Shaun Wackerly, Roseville, CA (US); Duane Edward Mentze, Roseville, CA (US); Charles F. Clark, Roseville, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 87 days.

This patent is subject to a terminal disclaimer.

(21) Appl. No.: 16/063,475

(22) PCT Filed: Dec. 17, 2015

(86) PCT No.: PCT/US2015/066262
§ 371 (c)(1),
(2) Date: Jun. 18, 2018

(87) PCT Pub. No.: WO2017/105452
PCT Pub. Date: Jun. 22, 2017

(65) Prior Publication Data
US 2018/0375802 A1 Dec. 27, 2018

(51) Int. Cl.
*H04L 12/931* (2013.01)
*H04L 12/813* (2013.01)
(Continued)

(52) U.S. Cl.
CPC ........ *H04L 49/503* (2013.01); *H04L 41/0806* (2013.01); *H04L 41/0893* (2013.01);
(Continued)

(58) Field of Classification Search
CPC ............ H04L 41/0806; H04L 41/0869; H04L 41/0873; H04L 41/0893; H04L 45/64;
(Continued)

(56) References Cited

U.S. PATENT DOCUMENTS

| 5,889,953 A | * | 3/1999 | Thebaut | G06F 21/30 |
| | | | | 709/221 |
| 6,691,168 B1 | * | 2/2004 | Bal | H04L 29/06 |
| | | | | 370/351 |

(Continued)

FOREIGN PATENT DOCUMENTS

| CN | 104734872 A | 6/2015 |
| EP | 2955884 A1 | 12/2015 |

OTHER PUBLICATIONS

"Group-based Policy for Openstack," Oct. 30, 2014, pp. 1-7, White Paper, Cisco Systems, Inc.

(Continued)

*Primary Examiner* — Greg C Bengzon
(74) *Attorney, Agent, or Firm* — Hewlett Packard Enterprise Patent Department

(57) ABSTRACT

In some examples, a method includes accessing an orthogonal network policy set that represents a first intent-based network policy and a second intent-based network policy. The method may also include determining multiple reduced orthogonal network policy sets from the orthogonal network policy set. The multiple reduced orthogonal network policy sets may differ from one another, and each represent the first and second intent-based network policies. The method may further include selecting a particular reduced orthogonal network policy set among the multiple reduced orthogonal network policy sets to implement on a target switching device.

12 Claims, 6 Drawing Sheets

(51) Int. Cl.
*H04L 12/851* (2013.01)
*H04L 12/24* (2006.01)
*H04L 12/715* (2013.01)

(52) U.S. Cl.
CPC .............. *H04L 45/64* (2013.01); *H04L 47/20* (2013.01); *H04L 47/24* (2013.01); *H04L 41/0869* (2013.01)

(58) Field of Classification Search
CPC . H04L 47/24; H04L 47/2416; H04L 47/2441; H04L 47/2475; H04L 47/2483; H04L 49/503; H04L 45/30; H04L 45/306; H04L 45/3065; H04L 45/38; H04L 45/52; H04L 45/66; H04L 45/72; H04L 47/18; H04L 47/19; H04L 47/193; H04L 47/196; H04L 47/20; H04L 47/801; H04L 47/803; H04L 47/808; H04L 49/35; H04L 49/354; H04L 49/355; H04L 51/12; H04L 51/14; H04L 51/18; H04L 67/141; H04L 67/147; H04L 67/2804; H04L 67/2814; H04L 67/2819; H04L 67/32; H04L 67/327; H04L 69/18; H04L 69/22; H04L 41/0672; H04L 41/0866; H04L 29/08972
See application file for complete search history.

(56) References Cited

U.S. PATENT DOCUMENTS

| | | | |
|---|---|---|---|
| 6,839,766 B1* | 1/2005 | Parnafes | H04L 41/0893 370/466 |
| 7,154,888 B1* | 12/2006 | Li | H04L 45/742 370/389 |
| 7,433,304 B1* | 10/2008 | Galloway | H04L 47/10 370/229 |
| 7,545,748 B1 | 6/2009 | Riddle | |
| 7,643,496 B1* | 1/2010 | Jamieson | H04L 47/10 370/400 |
| 7,688,727 B1* | 3/2010 | Ferguson | H04L 49/3009 370/230.1 |
| 7,742,406 B1* | 6/2010 | Muppala | H04L 41/5022 370/230 |
| 8,339,959 B1* | 12/2012 | Moisand | H04L 63/0236 370/235 |
| 8,401,006 B2* | 3/2013 | Johnson | H04L 47/41 370/353 |
| 8,509,071 B1* | 8/2013 | Narayanaswamy | H04L 41/5025 370/230 |
| 8,612,612 B1* | 12/2013 | Dukes | H04L 67/14 370/230 |
| 8,693,344 B1* | 4/2014 | Adams | H04L 41/0893 370/241 |
| 8,805,767 B1* | 8/2014 | Wang | G06N 20/00 706/47 |
| 9,544,402 B2* | 1/2017 | Worrell | |
| 9,674,081 B1* | 6/2017 | Jiang | H04L 45/38 |
| 10,356,037 B2* | 7/2019 | Devarajan | H04L 12/6418 |
| 10,374,871 B2* | 8/2019 | Ramachandran | H04L 45/02 |
| 2004/0177139 A1* | 9/2004 | Schuba | H04L 41/0873 709/223 |
| 2005/0080914 A1* | 4/2005 | Lerner | G06F 9/546 709/230 |
| 2006/0221967 A1* | 10/2006 | Narayan | H04L 45/00 370/392 |
| 2007/0110053 A1* | 5/2007 | Soni | H04L 63/0263 370/389 |
| 2007/0268514 A1* | 11/2007 | Zeldin | H04L 41/0213 358/1.15 |
| 2007/0268516 A1* | 11/2007 | Bugwadia | H04L 41/0809 358/1.15 |
| 2008/0215518 A1* | 9/2008 | Matsuda | H04L 63/02 706/47 |
| 2008/0301155 A1* | 12/2008 | Borgsmidt | G06Q 10/04 |
| 2010/0121975 A1* | 5/2010 | Sinha | H04L 65/103 709/231 |
| 2010/0274772 A1 | 10/2010 | Samuels | |
| 2011/0038375 A1* | 2/2011 | Liu | H04L 45/7453 370/392 |
| 2011/0055916 A1* | 3/2011 | Ahn | H04L 63/0227 726/13 |
| 2011/0320632 A1* | 12/2011 | Karino | H04L 45/38 709/238 |
| 2012/0166604 A1* | 6/2012 | Fortier | H04L 41/0893 709/223 |
| 2013/0163426 A1* | 6/2013 | Beliveau | H04L 67/327 370/235 |
| 2013/0163475 A1* | 6/2013 | Beliveau | H04L 67/327 370/257 |
| 2013/0230047 A1* | 9/2013 | Subrahmaniam | H04L 47/2441 370/392 |
| 2014/0006706 A1* | 1/2014 | Wang | G06F 16/90339 711/108 |
| 2014/0098669 A1* | 4/2014 | Garg | H04L 47/12 370/235 |
| 2014/0098673 A1* | 4/2014 | Lee | H04L 45/64 370/238 |
| 2014/0122672 A1* | 5/2014 | Chen | G06F 9/45558 709/221 |
| 2014/0180969 A1* | 6/2014 | Hettenkofer | G06N 20/00 706/11 |
| 2014/0233399 A1* | 8/2014 | Mann | H04L 41/0806 370/248 |
| 2014/0241356 A1* | 8/2014 | Zhang | H04L 45/38 370/392 |
| 2014/0241362 A1* | 8/2014 | Bosshart | H04L 69/22 370/392 |
| 2014/0269307 A1* | 9/2014 | Banerjee | H04L 47/2441 370/235 |
| 2014/0279833 A1* | 9/2014 | Gong | G06F 16/283 707/602 |
| 2014/0317684 A1* | 10/2014 | Porras | H04L 63/20 726/1 |
| 2014/0372770 A1 | 12/2014 | O'Hare et al. | |
| 2015/0016279 A1* | 1/2015 | Zhang | H04L 45/38 370/250 |
| 2015/0023210 A1* | 1/2015 | Kis | H04L 41/0806 370/254 |
| 2015/0089032 A1* | 3/2015 | Agarwal | H04L 41/0816 709/221 |
| 2015/0117450 A1* | 4/2015 | Thibaut | H04L 29/0653 370/392 |
| 2015/0128211 A1* | 5/2015 | Kirner | H04L 63/10 726/1 |
| 2015/0131666 A1* | 5/2015 | Kang | H04L 45/745 370/392 |
| 2015/0156122 A1 | 6/2015 | Singh et al. | |
| 2015/0163152 A1* | 6/2015 | Li | H04L 47/2441 370/409 |
| 2015/0189046 A1* | 7/2015 | Worrell | H04L 69/22 370/474 |
| 2015/0237013 A1* | 8/2015 | Bansal | H04L 63/0263 726/13 |
| 2015/0256397 A1* | 9/2015 | Agarwal | H04L 41/12 370/254 |
| 2015/0263889 A1* | 9/2015 | Newton | H04L 47/10 370/254 |
| 2015/0263946 A1* | 9/2015 | Tubaltsev | H04L 45/586 370/392 |
| 2015/0358290 A1* | 12/2015 | Jain | H04L 63/0263 711/108 |
| 2016/0006650 A1* | 1/2016 | Song | H04L 12/6418 370/329 |
| 2016/0050148 A1* | 2/2016 | Xu | H04L 47/24 370/235 |
| 2016/0112728 A1* | 4/2016 | Kaushik | H04N 21/2385 725/116 |

(56) References Cited

U.S. PATENT DOCUMENTS

| | | | |
|---|---|---|---|
| 2016/0112903 A1* | 4/2016 | Kaushik | H04W 28/0205 370/235 |
| 2016/0156520 A1* | 6/2016 | Scully | H04W 24/02 370/254 |
| 2016/0173657 A1* | 6/2016 | Tang | H04L 69/22 370/392 |
| 2016/0241467 A1* | 8/2016 | Gunasekaran | H04L 45/42 |
| 2016/0254995 A1* | 9/2016 | Wang | H04L 45/54 370/392 |
| 2016/0294646 A1* | 10/2016 | Kirner | H04L 41/5054 |
| 2016/0294682 A1* | 10/2016 | Bi | H04W 76/10 |
| 2016/0315781 A1* | 10/2016 | Dronadula | H04L 12/1886 |
| 2016/0315866 A1* | 10/2016 | Thapar | H04L 47/2408 |
| 2016/0337250 A1* | 11/2016 | Ni | G06Q 10/06 |
| 2016/0344624 A1* | 11/2016 | Banikazemi | H04L 45/7457 |
| 2016/0373344 A1* | 12/2016 | Wohlert | H04L 45/306 |
| 2017/0005814 A1* | 1/2017 | Gandotra | H04L 12/185 |
| 2017/0005986 A1* | 1/2017 | Bansal | H04L 63/0263 |
| 2017/0012870 A1* | 1/2017 | Blair | H04L 12/4633 |
| 2017/0019424 A1* | 1/2017 | Rodrigues De Moura Leitao | H04L 63/08 |
| 2017/0026283 A1* | 1/2017 | Williams | H04L 45/64 |
| 2017/0053058 A1* | 2/2017 | Yu | G06F 17/5081 |
| 2017/0093914 A1* | 3/2017 | Venkataramanan | H04L 63/101 |
| 2017/0093924 A1* | 3/2017 | Loo | H04L 63/20 |
| 2017/0180237 A1* | 6/2017 | Mulka | H04L 45/26 |
| 2017/0208016 A1* | 7/2017 | Lehane | H04L 41/5054 |
| 2017/0237604 A1* | 8/2017 | Wackerly | H04L 12/28 370/218 |
| 2017/0250869 A1* | 8/2017 | Voellmy | H04L 41/0893 |
| 2017/0250903 A1* | 8/2017 | Rasanen | H04L 47/20 |
| 2017/0264557 A1* | 9/2017 | John | H04L 45/64 |
| 2017/0288952 A1* | 10/2017 | Clark | H04L 41/0866 |
| 2018/0069786 A1* | 3/2018 | Lokman | H04L 45/48 |
| 2018/0241695 A1* | 8/2018 | Vaishnavi | H04L 41/0893 |
| 2018/0367649 A1* | 12/2018 | Tang | H04L 45/38 |
| 2018/0375802 A1* | 12/2018 | Wackerly | H04L 47/20 |
| 2019/0261160 A1* | 8/2019 | Raleigh | H04L 12/1403 |
| 2019/0273681 A1* | 9/2019 | Williams | H04L 45/586 |

OTHER PUBLICATIONS

Chaithan Prakash et al., "PGA: Using Graphs to Express and Automatically Reconcile Network Policies," SIGCOMM'15, Aug. 17-21, 2015, London, United Kingdom, pp. 1-14, ACM.

Evi Syukur and Seng Wai Loke, "Policy Based Control of Context Aware Pervasive Services," Apr. 2007, pp. 1-21, Journal of Ubiquitous Computing and Intelligence.

International Searching Authority, The International Search Report and the Written Opinion, Sep. 6, 2016, PCT/US2015/066262, 12 Pgs.

Jeffrey Shirley and David Evans, "The User is Not the Enemy: Fighting Malware by Tracking User Intentions," NSPW'08, Sep. 22-25, 2008, pp. 1-13, ACM.

Joseph A. Akinyele et al., Self-protecting Electronic Medical Records Using Attribute-based Encryption, Nov. 18, 2010, pp. 1-20.

European Search Report and Search Opinion Received for EP Application No. 15910924.8, dated Apr. 3, 2019, 13 pages.

* cited by examiner

REDUCED ORTHOGONAL NETWORK POLICY SET SELECTION

BACKGROUND

High speed communication networks form part of the backbone of what has become indispensable worldwide data connectivity. Within such communication networks, various network devices including endpoint devices and switching devices direct network traffic from source ports to destination ports, helping to eventually guide a data packet from a source to a destination. Improvements in the efficiency of these communication networks will increase the effectiveness of communicating data.

BRIEF DESCRIPTION OF THE DRAWINGS

Certain examples are described in the following detailed description and in reference to the drawings.

DETAILED DESCRIPTION

The disclosure herein describes systems, methods, devices, and logic that may support selection of a particular reduced orthogonal network policy set among multiple different reduced orthogonal network policy sets that each represent network policies to enforce on network traffic communicated across a communication network. As described in greater detail below, selection of the particular reduced orthogonal network policy set may be based on a characteristic of a target switching device, such as a switching capability of the target switching device. The selection features described herein may increase network operations efficiency and network throughput, such as through selection of a particular reduced orthogonal network policy set that the target switching device can implement with increased efficiency.

Figure 1:
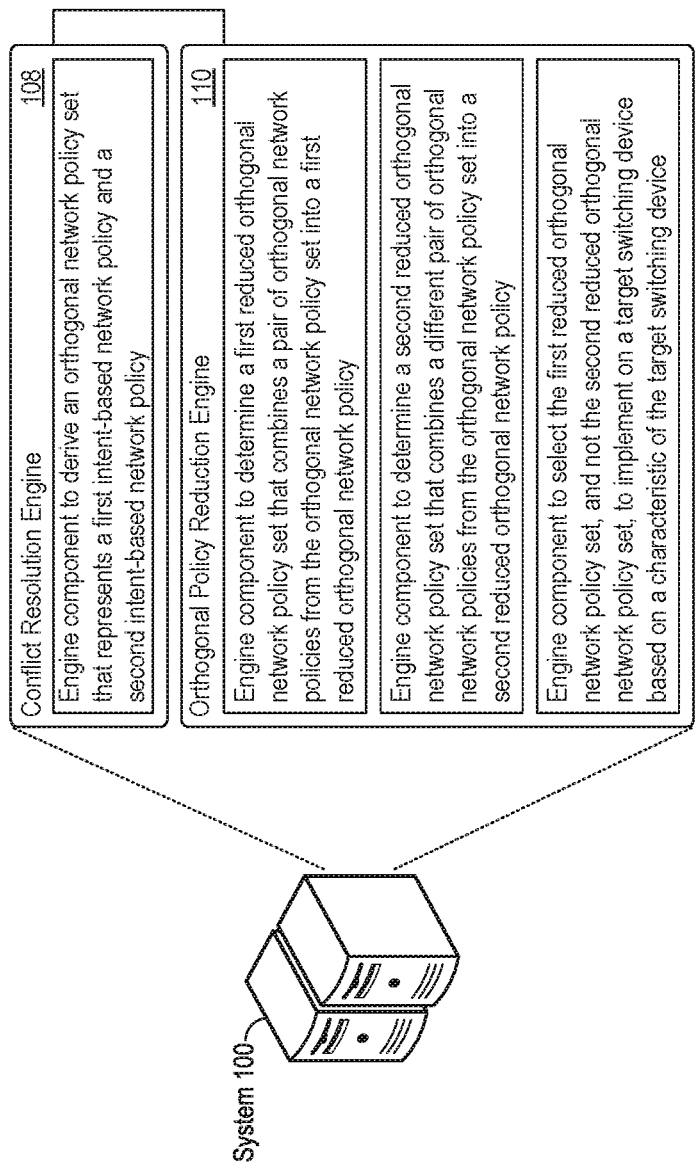
FIG. 1 shows an example of a system that supports reduced orthogonal network policy set selection.

FIG. 1 shows an example of a system 100 that supports reduced orthogonal network policy set selection. The system 100 may take the form of a computing system, including a single or multiple computing devices such as application servers, switching devices, network controllers, compute nodes, desktop or laptop computers, smart phones or other mobile devices, tablet devices, embedded controllers, and more. The system 100 may be part of a communication network, and may thus take the form of an endpoint device, a controller device that manages switching functions in the communication network, a switching device, a router, an edge device, or any other network device that transmits, receives, or otherwise controls the routing of data through the communication network. In some examples, the communication network is implemented, controlled, or managed through a software defined networking (SDN) architecture, and the system 100 may implement an SDN controller in such an example.

The system 100 may effectuate intent-based network policies in a communication network. An intent-based network policy may refer to or take the form of any expression of matching criteria for network traffic and a corresponding action to take for network traffic satisfying the matching criteria. The matching criteria of an intent-based network policy may be specified through various policy dimensions, and the matching criteria may thus include specific dimension values to match for among network traffic.

As one example, an intent-based network policy may specify a network policy according to source, destination, classifier, and context dimensions, wherein network traffic matching the specific dimension values of the policy result in performing of the corresponding action. The source dimension may include an indication of a source of network traffic (e.g., a source Internet Protocol (IP) address of an endpoint device transmitting a packet) and the destination dimension may include an indication of a destination for the network traffic. The classifier dimension may refer to a particular type of network traffic, a particular type of device to or from which the network traffic is routed, or any other type of identifier by which network traffic can be categorized. For instance, a classifier can include a combination of logical expressions involving an IP protocol, an ethernet type, an L4 source port, among other types of expressions. The context dimension may refer to a global condition during which the network policy should apply (e.g., during a particular timeframe, when network consumption exceeds a threshold level, or according to any other contextual criteria).

The system 100 may identify intent-based network policies from applications executing on endpoint devices of a communication network. For example, a particular application may specify a first intent-based network policy to "Inspect all traffic sent to the datacenter" and another application may specify a second intent-based network policy to "Log all IP traffic from contractors during 8 am-5 pm". When applications within the communication network want to control the same switching devices in the network to process network traffic in a particular way, a conflict may arise between the instructions of one application and the instructions of another application for a particular switching device. In such instances, the system 100 may support detection and resolution of policy conflicts that arise between different intent-based network policies, e.g., which action(s) to take when network traffic meets the matching criteria (e.g., specified dimension values) of more than one intent-based network policy.

In particular, the system 100 may transform the multiple intent-based network policies into an orthogonal network policy set. An orthogonal network policy set may refer to a set of multiple network policies (also referred to as orthogonal network policies) that are orthogonal to one another in that no orthogonal network policy in the orthogonal network policy set conflicts with any other orthogonal network policy in the orthogonal network policy set. Put another way, orthogonal network policies may not have any overlapping policy space in that the dimension values of the orthogonal network policies do not overlap. Conflict detection and determination of orthogonal network policy sets are described in further detail below as well as in PCT Application No. US2015/015122, entitled "Network Policy Conflict Detection and Resolution" and filed on Feb. 10, 2015, which is hereby incorporated by reference in its entirety. As also described in greater detail below, the system 100 may further reduce the orthogonal network policy set into multiple reduced orthogonal network policy sets and select a particular reduced orthogonal network policy set to implement on a target switching device, e.g., through translation into a protocol-specific format supported by the target switching device.

As one example, the system 100 shown in FIG. 1 includes a conflict resolution engine 108 and an orthogonal policy reduction engine 110. The system 100 may implement the engines 108 and 110 (and components thereof) in various ways, for example as hardware and programming. The programming for the engines 108 and 110 may take the form of processor-executable instructions stored on a non-transitory machine-readable storage medium and the hardware for the engines 108 and 110 may include a processing resource to execute those instructions. A processing resource may take the form of single processor or multi-processor systems, and in some examples, the system 100 implements multiple engines using the same computing system features or hardware components (e.g., a common processing resource).

As seen in the example shown in FIG. 1, the conflict resolution engine 108 may include an engine component to derive an orthogonal network policy set that represents a first intent-based network policy and a second intent-based network policy. As also seen in FIG. 1, the orthogonal policy reduction engine 110 may include engine components to determine a first reduced orthogonal network policy set that combines a pair of orthogonal network policies from the orthogonal network policy set into a first reduced orthogonal network policy; determine a second reduced orthogonal network policy set that combines a different pair of orthogonal network policies from the orthogonal network policy set into a second reduced orthogonal network policy; and select the first reduced orthogonal network policy set, and not the second reduced orthogonal network policy set, to implement on a target switching device based on a characteristic of the target switching device.

Some example features and concrete illustrations relating to reduced orthogonal network policy set selection are described in greater detail next.

Figure 2:
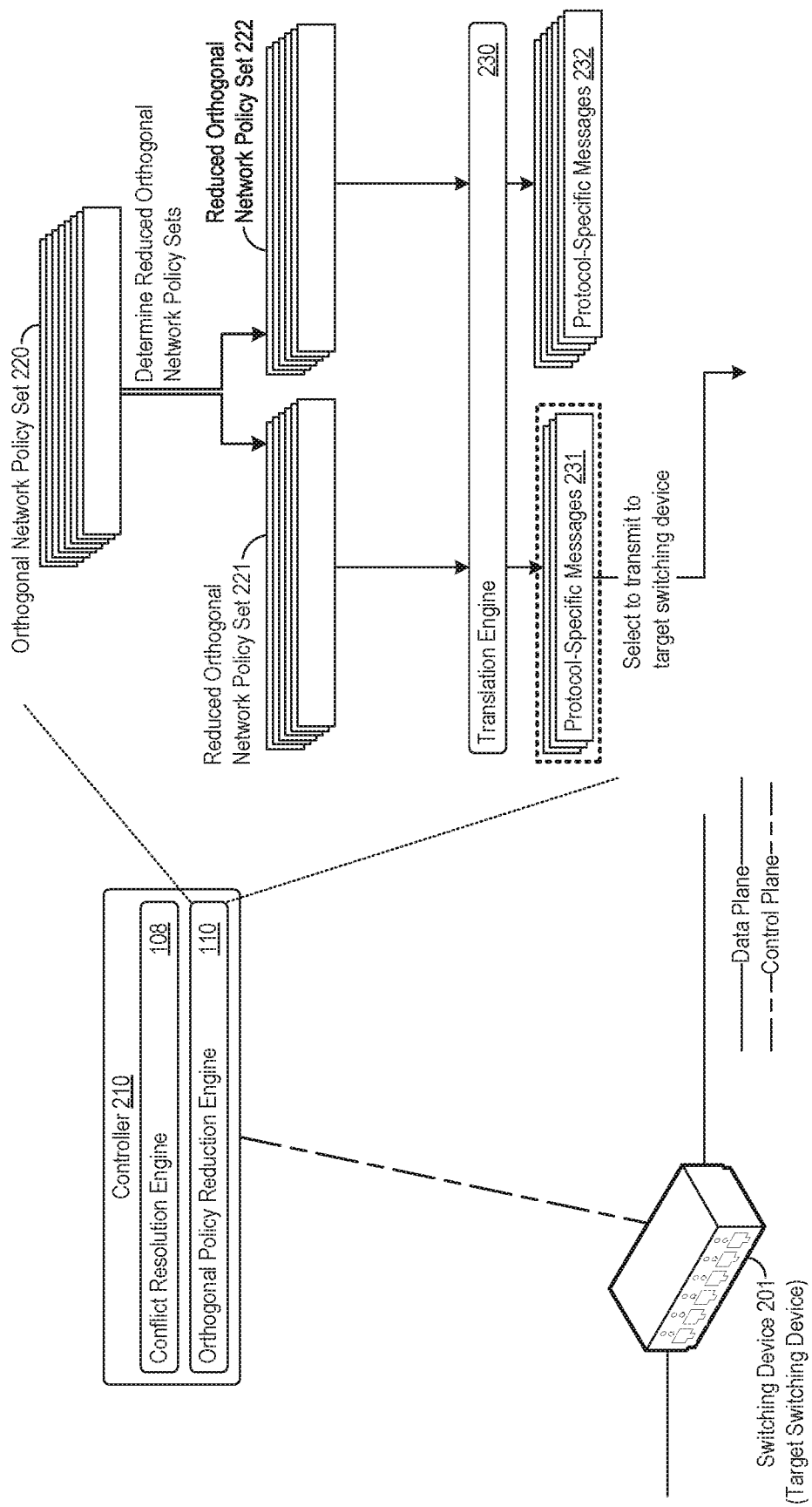
FIG. 2 shows an example selection of a reduced orthogonal network policy set by an orthogonal policy reduction engine.

FIG. 2 shows an example selection of a reduced orthogonal network policy set by the orthogonal policy reduction engine 110. The example in FIG. 2 includes a switching device 201, which may be any device that communicates network traffic such as a router, switch, hub, or various other network devices. A controller 210 is also shown in FIG. 2, which may manage the switching device 201. The controller 210 may implement a conflict resolution engine 108, orthogonal policy reduction engine 110, and any number of other engines to support conflict resolution and implementation of intent-based network policies in switching devices of a communication network. As noted above, the engines may take the form of hardware and programming, for example.

In some examples, the controller 210 is an SDN controller. The controller 210 may thus be physically separate from the switching devices managed by the controller 210, decoupling the system that makes decisions about where network traffic is sent (which may be referred to as a control plane) from the underlying systems that forward then the network traffic to the selected destination (which may be referred to as a data plane). The controller 210 may control how data traverses across the data plane, for example by determining and assigning data routes in the communication network for traffic flows and configuring the managed switching devices to route a particular traffic flow (also referred to as a dataflow) according to a determined data route. The controller 210 may thus assign network switching functions to a target switching device, such as the switching device 201 shown in FIG. 2.

The controller 210 may identify intent-based network policies specified by various applications, such as applications executing in an application layer of an SDN architecture. In response, the controller 210 may implement the intent-based network policies in a managed communication network, particularly by instructing switching devices which actions to take when network traffic satisfies the matching criteria (e.g., dimension values) of the intent-based network policies. For conflicts that arise between multiple intent-based network policies, the controller 210 may identify and resolve such conflicts. In doing so, the conflict resolution engine 108 may derive an orthogonal network policy set 220 that represents multiple intent-based network policies, including in any of the ways described in PCT Application No. US2015/015122.

The conflict resolution engine 108 may determine policy overlap between multiple intent-based policies with the following four dimensions: a source dimension, a destination dimension, a classifier dimension, and a context dimension. To illustrate through intent-based network policies "A" and "B", the conflict resolution engine 108 may identify orthogonal policy spaces "A and B" (or "A && B"), "A and not B" (or "A && !B"), and "not A and B" (or "!A && B"), and do so on a dimension-specific basis. Thus, for the 4-dimensional intent-based policies "A" and "B", up to a total of 81 orthogonal network policies without overlapping policy spaces are possible. Table 1 below illustrates the 81 possible orthogonal network policies that the conflict resolution engine 108 may identify for 4-dimensional intent-based network policies "A" and "B".

TABLE 1

Possible Orthogonal Network Policies for 4-dimensional Intent-Based Network Policies A and B

| Reference Number | Source | | Destination | | Classifier | | Context | | Valid? |
|---|---|---|---|---|---|---|---|---|---|
| | $S_A$ | $S_B$ | $D_A$ | $D_B$ | $C_A$ | $C_B$ | $T_A$ | $T_B$ | |
| #1 | 0 | 1 | 0 | 1 | 0 | 1 | 0 | 1 | |
| #2 | 0 | 1 | 0 | 1 | 0 | 1 | 1 | 0 | Invalid |
| #3 | 0 | 1 | 0 | 1 | 0 | 1 | 1 | 1 | |
| #4 | 0 | 1 | 0 | 1 | 1 | 0 | 0 | 1 | Invalid |
| #5 | 0 | 1 | 0 | 1 | 1 | 0 | 1 | 0 | Invalid |
| #6 | 0 | 1 | 0 | 1 | 1 | 0 | 1 | 1 | Invalid |
| #7 | 0 | 1 | 0 | 1 | 1 | 1 | 0 | 1 | |
| #8 | 0 | 1 | 0 | 1 | 1 | 1 | 1 | 0 | Invalid |
| #9 | 0 | 1 | 0 | 1 | 1 | 1 | 1 | 1 | |
| #10 | 0 | 1 | 1 | 0 | 0 | 1 | 0 | 1 | Invalid |
| #11 | 0 | 1 | 1 | 0 | 0 | 1 | 1 | 0 | Invalid |
| #12 | 0 | 1 | 1 | 0 | 0 | 1 | 1 | 1 | Invalid |
| #13 | 0 | 1 | 1 | 0 | 1 | 0 | 0 | 1 | Invalid |
| #14 | 0 | 1 | 1 | 0 | 1 | 0 | 1 | 0 | Invalid |
| #15 | 0 | 1 | 1 | 0 | 1 | 0 | 1 | 1 | Invalid |
| #16 | 0 | 1 | 1 | 0 | 1 | 1 | 0 | 1 | Invalid |
| #17 | 0 | 1 | 1 | 0 | 1 | 1 | 1 | 0 | Invalid |
| #18 | 0 | 1 | 1 | 0 | 1 | 1 | 1 | 1 | Invalid |
| #19 | 0 | 1 | 1 | 1 | 0 | 1 | 0 | 1 | |
| #20 | 0 | 1 | 1 | 1 | 0 | 1 | 1 | 0 | Invalid |
| #21 | 0 | 1 | 1 | 1 | 0 | 1 | 1 | 1 | |
| #22 | 0 | 1 | 1 | 1 | 1 | 0 | 0 | 1 | Invalid |
| #23 | 0 | 1 | 1 | 1 | 1 | 0 | 1 | 0 | Invalid |
| #24 | 0 | 1 | 1 | 1 | 1 | 0 | 1 | 1 | Invalid |
| #25 | 0 | 1 | 1 | 1 | 1 | 1 | 0 | 1 | |
| #26 | 0 | 1 | 1 | 1 | 1 | 1 | 1 | 0 | Invalid |
| #27 | 0 | 1 | 1 | 1 | 1 | 1 | 1 | 1 | |

TABLE 1-continued

Possible Orthogonal Network Policies for
4-dimensional Intent-Based Network Policies A and B

| Reference Number | Source | | Destination | | Classifier | | Context | | Valid? |
|---|---|---|---|---|---|---|---|---|---|
| | $S_A$ | $S_B$ | $D_A$ | $D_B$ | $C_A$ | $C_B$ | $T_A$ | $T_B$ | |
| #28 | 1 | 0 | 0 | 1 | 0 | 1 | 0 | 1 | Invalid |
| #29 | 1 | 0 | 0 | 1 | 0 | 1 | 1 | 0 | Invalid |
| #30 | 1 | 0 | 0 | 1 | 0 | 1 | 1 | 1 | Invalid |
| #31 | 1 | 0 | 0 | 1 | 1 | 0 | 0 | 1 | Invalid |
| #32 | 1 | 0 | 0 | 1 | 1 | 0 | 1 | 0 | Invalid |
| #33 | 1 | 0 | 0 | 1 | 1 | 0 | 1 | 1 | Invalid |
| #34 | 1 | 0 | 0 | 1 | 1 | 1 | 0 | 1 | Invalid |
| #35 | 1 | 0 | 0 | 1 | 1 | 1 | 1 | 0 | Invalid |
| #36 | 1 | 0 | 0 | 1 | 1 | 1 | 1 | 1 | Invalid |
| #37 | 1 | 0 | 1 | 0 | 0 | 1 | 0 | 1 | Invalid |
| #38 | 1 | 0 | 1 | 0 | 0 | 1 | 1 | 0 | Invalid |
| #39 | 1 | 0 | 1 | 0 | 0 | 1 | 1 | 1 | Invalid |
| #40 | 1 | 0 | 1 | 0 | 0 | 0 | 0 | 1 | Invalid |
| #41 | 1 | 0 | 1 | 0 | 1 | 0 | 1 | 0 | |
| #42 | 1 | 0 | 1 | 0 | 1 | 0 | 1 | 0 | |
| #43 | 1 | 0 | 1 | 0 | 1 | 1 | 0 | 1 | Invalid |
| #44 | 1 | 0 | 1 | 0 | 1 | 1 | 1 | 0 | |
| #45 | 1 | 0 | 1 | 0 | 1 | 1 | 1 | 1 | |
| #46 | 1 | 0 | 1 | 1 | 0 | 1 | 0 | 1 | Invalid |
| #47 | 1 | 0 | 1 | 1 | 0 | 1 | 1 | 0 | Invalid |
| #48 | 1 | 0 | 1 | 1 | 0 | 1 | 1 | 1 | Invalid |
| #49 | 1 | 0 | 1 | 1 | 1 | 0 | 0 | 1 | Invalid |
| #50 | 1 | 0 | 1 | 1 | 1 | 0 | 1 | 0 | |
| #51 | 1 | 0 | 1 | 1 | 1 | 0 | 1 | 1 | |
| #52 | 1 | 0 | 1 | 1 | 1 | 1 | 0 | 1 | Invalid |
| #53 | 1 | 0 | 1 | 1 | 1 | 1 | 1 | 0 | |
| #54 | 1 | 0 | 1 | 1 | 1 | 1 | 1 | 1 | |
| #55 | 1 | 1 | 0 | 1 | 0 | 1 | 0 | 1 | |
| #56 | 1 | 1 | 0 | 1 | 0 | 1 | 1 | 0 | Invalid |
| #57 | 1 | 1 | 0 | 1 | 0 | 1 | 1 | 1 | |
| #58 | 1 | 1 | 0 | 1 | 1 | 0 | 0 | 1 | Invalid |
| #59 | 1 | 1 | 0 | 1 | 1 | 0 | 1 | 0 | Invalid |
| #60 | 1 | 1 | 0 | 1 | 1 | 0 | 1 | 1 | Invalid |
| #61 | 1 | 1 | 0 | 1 | 1 | 1 | 0 | 1 | |
| #62 | 1 | 1 | 0 | 1 | 1 | 1 | 1 | 0 | Invalid |
| #63 | 1 | 1 | 0 | 1 | 1 | 1 | 1 | 1 | |
| #64 | 1 | 1 | 1 | 0 | 0 | 1 | 0 | 1 | Invalid |
| #65 | 1 | 1 | 1 | 0 | 0 | 1 | 1 | 0 | Invalid |
| #66 | 1 | 1 | 1 | 0 | 0 | 1 | 1 | 1 | Invalid |
| #67 | 1 | 1 | 1 | 0 | 1 | 0 | 0 | 1 | Invalid |
| #68 | 1 | 1 | 1 | 0 | 1 | 0 | 1 | 0 | |
| #69 | 1 | 1 | 1 | 0 | 1 | 0 | 1 | 1 | |
| #70 | 1 | 1 | 1 | 0 | 1 | 1 | 0 | 1 | Invalid |
| #71 | 1 | 1 | 1 | 0 | 1 | 1 | 1 | 0 | |
| #72 | 1 | 1 | 1 | 0 | 1 | 1 | 1 | 1 | |
| #73 | 1 | 1 | 1 | 1 | 0 | 0 | 0 | 1 | |
| #74 | 1 | 1 | 1 | 1 | 0 | 1 | 1 | 0 | Invalid |
| #75 | 1 | 1 | 1 | 1 | 0 | 1 | 1 | 1 | |
| #76 | 1 | 1 | 1 | 1 | 1 | 0 | 0 | 1 | Invalid |
| #77 | 1 | 1 | 1 | 1 | 1 | 0 | 1 | 0 | |
| #78 | 1 | 1 | 1 | 1 | 1 | 0 | 1 | 1 | |
| #79 | 1 | 1 | 1 | 1 | 1 | 1 | 0 | 1 | |
| #80 | 1 | 1 | 1 | 1 | 1 | 1 | 1 | 0 | |
| #81 | 1 | 1 | 1 | 1 | 1 | 1 | 1 | 1 | |

As shown above, some of the orthogonal network policies are labeled as "invalid". The conflict resolution engine 108 may identify such invalid orthogonal network policies, and exclude the invalid orthogonal network policies from the orthogonal network policy set 220. An invalid orthogonal network policy may refer to an orthogonal network policy that represents a policy space that exclusively matches one dimension of the first policy and exclusively matches another dimension of the second policy. Since both policies are excluded in at least one dimension, neither the matching criteria of the first policy nor the matching criteria of the second policy are met. Thus, the entire orthogonal policy does not apply and can thus be deemed invalid.

For instance, each of network policies #10-#18 includes (i) only the source dimension matching criterion of intent-based network policy "B", and (ii) only the destination dimension matching criterion of intent-based network policy "A". Thus, for each of these network policies #10-#18, the intent-based network policies "A" and "B", one dimension (the source dimension) of network policy "A" is excluded and one dimension of network policy "B" (the destination dimension) is excluded, regardless of the classifier and context dimensions for these intent-based network policies. That is, for policies #10-#18, the matching criteria of both policy "A" and policy "B" are not met, so there is no action to perform. These policies #10-#18 may therefore be identified as invalid by the conflict resolution engine 108. The conflict resolution engine 108 may similarly identify other invalid orthogonal network policies to exclude from the orthogonal network policy set 220.

Table 1 above includes a "Valid?" column indicating invalid orthogonal network policies that the conflict resolution engine 108 may exclude from the orthogonal network policy set 220. Table 2 illustrates 31 possible valid orthogonal network policies that the conflict resolution engine 108 may identify for 4-dimensional intent-based network policies "A" and "B", using consistent policy reference numbers with Table 1.

TABLE 2

Possible Valid Orthogonal Network Policies for
4-dimensional Intent-Based Network Policies A and B

| Reference Number | Source | | Destination | | Classifier | | Context | | Action |
|---|---|---|---|---|---|---|---|---|---|
| | $S_A$ | $S_B$ | $D_A$ | $D_B$ | $C_A$ | $C_B$ | $T_A$ | $T_B$ | |
| #1 | 0 | 1 | 0 | 1 | 0 | 1 | 0 | 1 | $Action_B$ |
| #3 | 0 | 1 | 0 | 1 | 0 | 1 | 1 | 1 | $Action_B$ |
| #7 | 0 | 1 | 0 | 1 | 1 | 1 | 0 | 1 | $Action_B$ |
| #9 | 0 | 1 | 0 | 1 | 1 | 1 | 1 | 1 | $Action_B$ |
| #19 | 0 | 1 | 1 | 1 | 0 | 1 | 0 | 1 | $Action_B$ |
| #21 | 0 | 1 | 1 | 1 | 0 | 1 | 1 | 1 | $Action_B$ |
| #25 | 0 | 1 | 1 | 1 | 1 | 1 | 0 | 1 | $Action_B$ |
| #27 | 0 | 1 | 1 | 1 | 1 | 1 | 1 | 1 | $Action_B$ |
| #41 | 1 | 0 | 1 | 0 | 1 | 0 | 1 | 0 | $Action_A$ |
| #42 | 1 | 0 | 1 | 0 | 1 | 0 | 1 | 1 | $Action_A$ |
| #44 | 1 | 0 | 1 | 0 | 1 | 1 | 1 | 0 | $Action_A$ |
| #45 | 1 | 0 | 1 | 0 | 1 | 1 | 1 | 1 | $Action_A$ |
| #50 | 1 | 0 | 1 | 1 | 1 | 0 | 1 | 0 | $Action_A$ |
| #51 | 1 | 0 | 1 | 1 | 1 | 0 | 1 | 1 | $Action_A$ |
| #53 | 1 | 0 | 1 | 1 | 1 | 1 | 1 | 0 | $Action_A$ |
| #54 | 1 | 0 | 1 | 1 | 1 | 1 | 1 | 1 | $Action_A$ |
| #55 | 1 | 1 | 0 | 1 | 0 | 1 | 0 | 1 | $Action_B$ |
| #57 | 1 | 1 | 0 | 1 | 0 | 1 | 1 | 1 | $Action_B$ |
| #61 | 1 | 1 | 0 | 1 | 1 | 1 | 0 | 1 | $Action_B$ |
| #63 | 1 | 1 | 0 | 1 | 1 | 1 | 1 | 1 | $Action_B$ |
| #68 | 1 | 1 | 1 | 0 | 1 | 0 | 1 | 0 | $Action_A$ |
| #69 | 1 | 1 | 1 | 0 | 1 | 0 | 1 | 1 | $Action_A$ |
| #71 | 1 | 1 | 1 | 0 | 1 | 1 | 1 | 0 | $Action_A$ |
| #72 | 1 | 1 | 1 | 0 | 1 | 1 | 1 | 1 | $Action_A$ |
| #73 | 1 | 1 | 1 | 1 | 0 | 0 | 0 | 1 | $Action_B$ |
| #75 | 1 | 1 | 1 | 1 | 0 | 1 | 1 | 1 | $Action_B$ |
| #77 | 1 | 1 | 1 | 1 | 1 | 0 | 1 | 0 | $Action_A$ |
| #78 | 1 | 1 | 1 | 1 | 1 | 0 | 1 | 1 | $Action_A$ |
| #79 | 1 | 1 | 1 | 1 | 1 | 1 | 0 | 1 | $Action_B$ |
| #80 | 1 | 1 | 1 | 1 | 1 | 1 | 1 | 0 | $Action_A$ |
| #81 | 1 | 1 | 1 | 1 | 1 | 1 | 1 | 1 | $Action_A$ + $Action_B$ |

As seen above, Table 2 above illustrates the corresponding action to perform for each of the possible valid orthogonal network policies. The corresponding action to perform may be reflective of the intent-based network policy "A" or "B" that has each of its matching criteria met for a particular orthogonal network policy. For instance, orthogonal network policy #69 has a "1" (or satisfied) value for each of the source, destination, classifier, and context dimensions for policy "A", and thus the action for intent-based network policy "B" is performed (denoted as Actions). For orthogonal network policy #81, the conflict resolution engine 108 may determine that the corresponding action for both network policies "A" and "B" are performed, as policy #81 includes a satisfied value for each of the dimensions for both policies "A" and "B".

Thus, for the example 4-dimensional intent-based network policies "A" and "B", the conflict resolution engine 108 may derive up to 31 orthogonal network policies to include in orthogonal network policy set 220. However, the exact number of orthogonal network policies specified included in the orthogonal network policy set 220 may vary depending on the specific matching criteria (e.g., dimension values) of the intent-based network policies "A" and "B". To illustrate, the intent-based network policies "A" and "B" may have some or no overlapping policy spaces for a particular policy dimension (e.g., a source dimension). As such, the conflict resolution engine 108 may determine not to include some of the possible orthogonal network policies listed above in Table 2 in the orthogonal network policy set 220. The number of orthogonal network policies included in the orthogonal network policy set 220 may thus vary according to the degree of overlap between the intent-based network policies represented by the orthogonal network policy set 220.

To provide a continuing, concrete illustration to help explain the features described herein, the controller 210 may control switching devices in a communication network (e.g., according to an SDN architecture) to implement an intent-based network policy P1 to "Inspect all traffic sent to the datacenter" and an intent-based network policy P2 to "Log all IP traffic from contractors during 8 am-5 pm". In this concrete illustration, the controller 210 may identify the intent-based network policy P1 in a 4-dimensional intent-based network policy framework as follows:

| Source$_{P1}$ | Destination$_{P1}$ | Classifier$_{P1}$ | Context$_{P1}$ | Action$_{P1}$ |
|---|---|---|---|---|
| * | Datacenter | * | * | Inspect |

Thus, the controller 210 may identify matching criteria for the source, destination, classifier, and context dimensions as well as a corresponding action for network traffic satisfying the matching criteria. The * matching criteria value in the intent-based network policy P1 may be a wildcard value representative of any value, an unspecified value, or a "do not care" value for the source, classifier, and context dimensions. That is, the * wildcard value may indicate that any value for the particular dimension will satisfy the matching criteria of the network policy. For the intent-based network policy P2, the controller 210 may identify the intent-based policy P2 in the 4-dimensional intent-based network policy framework as follows:

| Source$_{P2}$ | Destination$_{P2}$ | Classifier$_{P2}$ | Context$_{P2}$ | Action$_{P2}$ |
|---|---|---|---|---|
| Contractor | * | IP | 8am-5pm | Log |

From the intent-based network policies P1 and P2, the conflict resolution engine 108 may determine an orthogonal network policy set 220 that includes multiple orthogonal network policies that together represent the policies P1 and P2 (and resolving conflicts between overlapping policy spaces).

Thus, applying these concrete network policies P1 and P2 to the valid orthogonal network policies in Table 2 above, the conflict resolution engine 108 may identify the following dimension values for the valid orthogonal network policies, shown in Table 3 below (with actions shown):

TABLE 3

Dimension Values for Example Network Policies P1 and P2

| Reference Number | Source | Destination | Classifier | Context | Action |
|---|---|---|---|---|---|
| #1 | None | !Datacenter | None | Never | Log |
| #3 | None | !Datacenter | None | 8am-5pm | Log |
| #7 | None | !Datacenter | IP | Never | Log |
| #9 | None | !Datacenter | IP | 8am-5pm | Log |
| #19 | None | Datacenter | None | Never | Log |
| #21 | None | Datacenter | None | 8am-5pm | Log |
| #25 | None | Datacenter | IP | Never | Log |
| #27 | None | Datacenter | IP | 8am-5pm | Log |
| #41 | !Contractor | None | !IP | !(8am-5pm) | Inspect |
| #42 | !Contractor | None | !IP | 8am-5pm | Inspect |
| #44 | !Contractor | None | IP | !(8am-5pm) | Inspect |
| #45 | !Contractor | None | IP | 8am-5pm | Inspect |
| #50 | !Contractor | Datacenter | !IP | !(8am-5pm) | Inspect |
| #51 | !Contractor | Datacenter | !IP | 8am-5pm | Inspect |
| #53 | !Contractor | Datacenter | IP | !(8am-5pm) | Inspect |
| #54 | !Contractor | Datacenter | IP | 8am-5pm | Inspect |
| #55 | Contractor | !Datacenter | None | Never | Log |
| #57 | Contractor | !Datacenter | None | 8am-5pm | Log |
| #61 | Contractor | !Datacenter | IP | Never | Log |
| #63 | Contractor | !Datacenter | IP | 8am-5pm | Log |
| #68 | Contractor | None | !IP | !(8am-5pm) | Inspect |
| #69 | Contractor | None | !IP | 8am-5pm | Inspect |
| #71 | Contractor | None | IP | !(8am-5pm) | Inspect |
| #72 | Contractor | None | IP | 8am-5pm | Inspect |
| #73 | Contractor | Datacenter | None | Never | Log |
| #75 | Contractor | Datacenter | None | 8am-5pm | Log |
| #77 | Contractor | Datacenter | !IP | !(8am-5pm) | Inspect |
| #78 | Contractor | Datacenter | !IP | 8am-5pm | Inspect |
| #79 | Contractor | Datacenter | IP | Never | Log |
| #80 | Contractor | Datacenter | IP | !(8am-5pm) | Inspect |
| #81 | Contractor | Datacenter | IP | 8am-5pm | Inspect + Log |

Note that the expression (not *) or (!*), which represents the inverse of an "any" value, reduces to a "none" value for the source, destination, and classifier dimensions and to a "never" value for the context dimension. Also, the logical combination of any matching criterion with a "none" or "never" value reduces simply to "none" or "never". For example, a source dimension expression of (Contractor && !*) reduces to none, because there is no dimension value that satisfies the expression. Likewise, a context dimension expression of (8 am-5 pm && !*) reduces to never, as the inverse of an "any" context dimension value (or "unspecified") is never (or none), and the logical combination of any matching criterion with a "never" value reduces simply to "never". Also note that the logical combination of a wildcard value * and a particular dimension value reduces to just the particular dimension value. For example, the source dimension value for orthogonal network policy #50 can be represented as the expression (Source$_{P1}$ && !Source$_{P2}$). In the concrete illustration, this expression takes the form (* && !Contractor), and reduces to simply (!Contractor) as shown above.

For orthogonal network policies with a "none" or "never" value for any dimension, the conflict resolution engine 108 may exclude, ignore, or prune such policies from the orthogonal network policy 220. Thus, for this particular concrete illustration, the conflict resolution engine 108 may determine the orthogonal network policy set 220 to include 9 orthogonal network policies instead of all 31 of the possible orthogonal network policies listed above. In particular, the conflict resolution engine 108 may identify the following orthogonal network policies shown in Table 4 to represent the intent-based network policies P1 and P2 in this concrete illustration:

TABLE 4

Example Orthogonal Network Policy Set 220 (with actions) for example Network Policies P1 and P2

| Reference Number | Source | Destination | Classifier | Context | Action |
|---|---|---|---|---|---|
| #50 | !Contractor | Datacenter | !IP | !(8am-5pm) | Inspect |
| #51 | !Contractor | Datacenter | !IP | 8am-5pm | Inspect |
| #53 | !Contractor | Datacenter | IP | !(8am-5pm) | Inspect |
| #54 | !Contractor | Datacenter | IP | 8am-5pm | Inspect |
| #63 | Contractor | !Datacenter | IP | 8am-5pm | Log |
| #77 | Contractor | Datacenter | !IP | !(8am-5pm) | Inspect |
| #78 | Contractor | Datacenter | !IP | 8am-5pm | Inspect |
| #80 | Contractor | Datacenter | IP | !(8am-5pm) | Inspect |
| #81 | Contractor | Datacenter | IP | 8am-5pm | Inspect + Log |

Thus, the conflict resolution engine 108 may determine the orthogonal network policy set 220 in this concrete illustration to include the 9 orthogonal network policies above.

From the orthogonal network policy set 220, the orthogonal policy reduction engine 110 may determine multiple reduced orthogonal network policy sets, such as the reduced orthogonal network policy sets 221 and 222 shown in FIG. 2. A reduced orthogonal network policy set may refer to a set of orthogonal network policies that includes at least one combined orthogonal network policy that combines two or more orthogonal network policies, e.g., network policies from the orthogonal network policy set 220 or previously-combined orthogonal network policies. The reduced orthogonal network policy set may be reduced in the sense that it includes a lesser number of orthogonal network policies than the original orthogonal network policy set 220.

The orthogonal policy reduction engine 110 may combine various orthogonal network policies in an orthogonal network policy set 220 in differing combinations to generate multiple, different reduced orthogonal network policy sets. Each of the reduced orthogonal network policy sets may represent the same intent-based network policies, but do so in different ways. The example in FIG. 2 shows two reduced orthogonal network policy sets that the orthogonal policy reduction engine 110 determines (labeled as the reduced orthogonal network policy sets 221 and 222 respectively), though the orthogonal policy reduction engine 110 may determine more reduced orthogonal network policy sets than two.

The orthogonal policy reduction engine 110 may combine orthogonal network policies through a wildcard value (denoted herein as a * value). For instance, the orthogonal policy reduction engine 110 may identify a pair of orthogonal network policies that differ in whether a matching criterion of a particular policy dimension is satisfied, and combine the pair of orthogonal network policies into a combined orthogonal network policy that utilizes the wildcard value for the differing dimension value. The pair may be two orthogonal network policies from the orthogonal network policy set 220, an orthogonal network policy from the orthogonal network policy set 220 and a previously-combined orthogonal network policy, or two previously-combined orthogonal network policies. As an example, the orthogonal policy reduction engine 110 may determine that the orthogonal network policy set 220 representing a particular set of intent-based network policies (e.g., intent-based network policies P1 and P2) includes the following three orthogonal network policies that correspond to policy reference numbers #78, #77, and #80 from Tables 1, 2, 3, and 4 above:

| Reference Number | Source | | Destination | | Classifier | | Context | |
|---|---|---|---|---|---|---|---|---|
| | $S_{P1}$ | $S_{P2}$ | $D_{P1}$ | $D_{P2}$ | $C_{P1}$ | $C_{P2}$ | $T_{P1}$ | $T_{P2}$ |
| #78 | 1 | 1 | 1 | 1 | 1 | 0 | 1 | 1 |
| #77 | 1 | 1 | 1 | 1 | 1 | 0 | 1 | 0 |
| #80 | 1 | 1 | 1 | 1 | 1 | 1 | 1 | 0 |

The orthogonal network policies #78, #77, and #80 may be a subset of the orthogonal network policy set 220, e.g., as shown in Table 4 in the context of the continuing, concrete illustration. As seen above, orthogonal network policies #78 and #77 differ only in whether the matching criterion (or criteria) of the context dimension of the intent-based network policy P2 is satisfied or not. Orthogonal network policies #77 and #80 differ only in whether the matching criterion (or criteria) of the classifier dimension value of the intent-based network policy P2 is satisfied or not.

In the example above, the orthogonal policy reduction engine 110 may determine a first reduced orthogonal network policy set that includes the orthogonal policies #78 and #77 combined into the following combined orthogonal network policy:

| Source | | Destination | | Classifier | | Context | |
|---|---|---|---|---|---|---|---|
| $S_{P1}$ | $S_{P2}$ | $D_{P1}$ | $D_{P2}$ | $C_{P1}$ | $C_{P2}$ | $T_{P1}$ | $T_{P2}$ |
| 1 | 1 | 1 | 1 | 1 | 0 | 1 | * |

In a consistent manner, the orthogonal policy reduction engine 110 may determine a second reduced orthogonal network policy set that combines a different pair of orthogonal network policies, such as orthogonal network policies #77 and #80, which may be combined into the following combined orthogonal network policy:

| Source | | Destination | | Classifier | | Context | |
|---|---|---|---|---|---|---|---|
| $S_{P1}$ | $S_{P2}$ | $D_{P1}$ | $D_{P2}$ | $C_{P1}$ | $C_{P2}$ | $T_{P1}$ | $T_{P2}$ |
| 1 | 1 | 1 | 1 | 1 | * | 1 | 0 |

In this example, the first and second reduced orthogonal network policy sets each represent the same intent-based network policies, but do so with a different combination of orthogonal and combined orthogonal network policies.

To illustrate in the context of the continuing concrete illustration with the intent-based network policies P1 and P2, the orthogonal policy reduction engine 110 may derive the following three orthogonal network policies as a subset of the orthogonal network policy set 220 (using consistent reference numbers as Tables 1, 2, 3, and 4):

| Reference | Source | Destination | Classifier | Context | Action |
|---|---|---|---|---|---|
| #78 | Contractor | Datacenter | !IP | (8am-5pm) | Inspect |
| #77 | Contractor | Datacenter | !IP | !(8am-5pm) | Inspect |
| #80 | Contractor | Datacenter | IP | !(8am-5pm) | Inspect |

The orthogonal policy reduction engine 110 may thus combine policies #78 and #77 to determine a first reduced orthogonal network policy set and combine policies #77 and #78 to determine a second, different orthogonal network policy set (and even more beyond these two as well, as illustrated in greater detail below). Then, the orthogonal policy reduction engine 110 may select a particular reduced orthogonal network policy set to implement on the target switching device. A detailed illustration of reduced orthogonal network policy set determination in the context of the continuing concrete illustration with intent-based network policies P1 and P2 is presented below.

In some examples, the orthogonal policy reduction engine 110 combines orthogonal network policies with the same corresponding action, but determines not to combine orthogonal network policies with different corresponding actions. For instance, the orthogonal policy reduction engine 110 may determine not to combine a first orthogonal network policy with a corresponding action (e.g., inspect) with a second orthogonal network policy with a different corresponding action (e.g., log or log+inspect).

While an example combinations of orthogonal network policies were described above, the orthogonal policy reduction engine 110 may combine orthogonal network policies in multiple different ways and for multiple different dimensions. The orthogonal policy reduction engine 110 may determine reduced orthogonal network policy sets iteratively, sequentially, or in parallel by further combining previously-combined orthogonal network policies with other orthogonal network policies (or other previously-combined orthogonal network policies) to yield many different combinations. The process by which the orthogonal policy reduction engine 110 determines reduced orthogonal network policy sets from the orthogonal network policy set 220 may also be referred to as reductions of the orthogonal network policy set 220.

Thus, the orthogonal policy reduction engine 110 may generate multiple reduced orthogonal network policy sets that each include a single or multiple combined orthogonal network policy, the multiple reduced orthogonal network policy sets resulting from multiple, different combinations of orthogonal network policies. In some examples, the controller 210 may set a combination limit for the number of combinations that occur to control resource consumption (e.g., by limiting the number of combinations included for a particular combined orthogonal network policy or in various other ways).

From the multiple reduced orthogonal network policy sets, the orthogonal policy reduction engine 110 may select a particular reduced orthogonal network policy set to implement on a target switching device. In FIG. 2, the switching device 201 is the target switching device that the orthogonal policy reduction engine 110 selects a particular reduced orthogonal network policy set for, e.g., from among the reduced orthogonal network policy sets 221 and 222 and any other reduced orthogonal network policy sets that are determined.

In some implementations, the orthogonal policy reduction engine 110 selects a particular reduced orthogonal network policy set for implementation after translating some or all of the multiple reduced orthogonal network policy sets into a protocol-specific format supported by the target switching device. The protocol-specific format may refer to a configuration message format or switching configuration format of a protocol used by a switching device to implement matching criteria and perform the corresponding action. Example protocols include the OpenFlow protocol for SDN architectures or Access Control Lists (ACLs). Translation of a reduced orthogonal network policy set may thus take the form of protocol-specific messages (e.g., OpenFlow messages or ACL messages).

In the example shown in FIG. 2, the orthogonal policy reduction engine 110 passes the reduced orthogonal network policy sets 221 and 222 to the translation engine 230, which may also be part of the controller 210. The translation engine 230 may translate the reduced orthogonal network policy sets 221 and 222 into a protocol-specific format supported by the switching device 201, including according to any of the ways described in U.S. PCT Application No. US2015/015122. In this example, the orthogonal policy reduction engine 110 selects the particular reduced orthogonal network policy set to implement on the switching device 201 from the translated protocol-specific messages 231 and 232. That is, the orthogonal policy reduction engine 110 selects the reduced orthogonal network policy set 221 in this particular example. In doing so, the orthogonal policy reduction engine 110 may make the selection based on various factors or combination of factors, some example of which are presented next.

The orthogonal policy reduction engine 110 may select a particular reduced orthogonal network policy set based on a characteristic of the target switching device. For instance, the orthogonal policy reduction engine 110 may identify a resource consumption rate, particular switching capability, table implementation, packet processing characteristic, or any other attribute of the target switching device to account for in selecting a particular reduced orthogonal network policy set to translate. By accounting for a specific characteristic of the target switching device itself, the orthogonal policy reduction engine 110 may select a particular reduced orthogonal network policy set that, when translated into a protocol-specific format, supports effectuating the represent intent-based network policies with increased efficiency, e.g., with reduced resource consumption or increased network throughput.

In some examples, the characteristic of the target switching device accounted for in the reduced orthogonal network policy set selection is a wildcard processing capability for a particular match field in the orthogonal network policy set 220. A match field may refer to a particular packet characteristic that corresponds to a dimension value of the orthogonal network policy set 220, e.g., the source IP address of a packet that corresponds to a source dimension value of the orthogonal network policy set 220. Thus, when the target switching device supports wildcard processing capabilities for a particular match field, but not other match fields, the orthogonal policy reduction engine 110 may select a reduced orthogonal network policy set that includes a wildcard value for the particular match field (e.g., for the corresponding dimension value).

As another example, the characteristic of the target switch device accounted for in the reduced orthogonal network policy set selection may be a table capability of the target switch device. A table may refer to any lookup mechanism or logic by which a switching device parses network traffic, e.g., to identify network traffic satisfying matching criteria for packet forwarding or security actions, and the like. Thus, a table capability of the switching device may refer to any capability with regards to how the switching device processes packet data. Example table capabilities of the target switching device include a number of tables implemented by the target switching device, a table size of a table implemented by the target switching device, a number, type, or combination of actions supported by the table implemented by the target switching device, a particular action that the table implemented by the target switching device implements with increased efficiency, or any combination thereof.

As another example, the orthogonal policy reduction engine 110 may select the particular reduced orthogonal network policy set based on the implementation of a table or other packet processing logic. For instance, the target switching device may implement a table for a particular action using a ternary content addressable memory (TCAM), for which the orthogonal policy reduction engine 110 may select, for implementation, a reduced orthogonal network policy set that matches on multiple fields and has a lesser number of flow entries to match for. On the other hand, when the target switching device implements a table for the particular application using a hash table, the orthogonal policy reduction engine 110 may select a reduced orthogonal network policy set that may have a larger number of flows entries, but matches on a single field (instead of multiple fields).

In accounting for the characteristics of the target switching device, the orthogonal policy reduction engine 110 may select the reduced orthogonal policy network set to maintain a particular action distribution among flows tables of the target switching device. For instance, the target switching device may assign a high-performance table for a particular action (e.g., duplicate packets) and assign other low-performance tables for other actions with lesser performance requirements (e.g., drop packets). A high-performance table may refer to a table or other packet processing logic that processes network traffic above a threshold rate or at a rate greater than other tables implemented by a switching device (e.g., low-performance tables). In this example, the orthogonal policy reduction engine 110 may select a particular reduced orthogonal network policy set that maintains the action distribution for the high-performance table, the low-performance tables, or both. The orthogonal policy reduction engine 110 may do so by selecting a particular reduced orthogonal network policy set with a lesser number of flows to match for the high-performance action, for example.

In that regard, the orthogonal policy reduction engine 110 may account for a table scale of any number of tables of the target switching device. Table scale may refer to the used capacity or unused capacity of a particular table of the switching device. The orthogonal policy reduction engine 110 may select the particular reduced orthogonal network policy set according to particular table scale criteria, such as increasing the used capacity of a particular low-performance table above a threshold level (e.g., >90% used capacity) or not increasing the used capacity of a high-performance table beyond a threshold amount or at all (e.g., implements only 30 additional table entries for a high-performance table or any other configurable value or metric). Thus, accounting for table scale may allow the orthogonal policy reduction engine 110 to specifically select the reduced orthogonal network policy set to implement while decreasing performance impact, e.g., when the implemented network policies of the reduced orthogonal network policy set do not include performance-intensive actions, allowing reservation of high-performance tables for other policies with higher performance utilization.

The number of dataflows or table entries to match for may be a factor that the orthogonal policy reduction engine 110 accounts for in selecting a reduced orthogonal network policy set among the multiple reduced orthogonal network policy sets. A dataflow may refer to a stream of data communicated between a source and a destination, either of which may be a single or set of endpoint entities (e.g., devices, IP addresses, etc.). In that regard, a dataflow may refer to a class of network traffic. A table entry may refer to any packet processing mechanism by which a switching device identifies a dataflow (or set of dataflows). Thus, a table entry for a switching device may specify specific matching criteria to identify in network traffic, including as examples a source and destination IP address, ethertype, packet priority, or various other data fields to parse from a data packet. In accounting for the number of dataflows or table entries, the orthogonal policy reduction engine 110 may determine that protocol-specific messages translated from a particular reduced orthogonal network policy set result in the least number of table entries to implement in the target switching device or the least number of dataflows to match for from among protocol-specific messages that were or would be translated from each of the multiple reduced orthogonal network policy sets.

As another example, selecting of the particular reduced orthogonal network policy set may be based on a number of data values for a particular match field in the orthogonal network policy set. To illustrate, a first reduced orthogonal network policy set may specify matching a classifier dimension value of "contractor" and wildcard a source dimension value and a second reduced orthogonal network policy set may specify matching the source dimension value for "datacenter" and wildcard the classifier dimension value. In this example, the number of contractors (e.g., data values meeting the "contractor" dimension value) and number datacenters (e.g., data values meeting the "datacenter" dimension value) may be accounted for by the orthogonal policy reduction engine 110. Thus, if there are 200 contractors but only 2 datacenters accessing the communication network, the orthogonal policy reduction engine 110 may select the second reduced orthogonal network policy set for implementation on the target switching device.

In some implementations, the orthogonal policy reduction engine 110 accounts for table performance and efficiency of the various tables implemented in a target switching device. A switching device may implement different tables that support the same action, and the different tables may have different performance characteristics (e.g., higher performance tables may process packets with a particular action or combination of actions with increased throughput, speed, or efficiency). In that regard, the orthogonal policy reduction engine 110 may select a particular reduced orthogonal network policy set that has more table entries than another reduced orthogonal network policy set, but can be implemented (partially or wholly) in a higher-performance table in the switching device. When the higher-performance table does not have an unused capacity to support all of the table entries translated from reduced orthogonal network policy sets, the orthogonal network policy may select a particular reduced orthogonal network policy set with table entries mapping to dataflows with a priority level, consumed bandwidth, number of associated end hosts, or any other dataflow characteristic that exceeds a predetermined threshold (e.g. high-priority, high level of expected bandwidth consumption, etc.)

In the example described above, the orthogonal policy reduction engine 110 may select a particular reduced orthogonal network policy set that translates into a greater number of table entries to implement or dataflows to match for than other reduced orthogonal network policy sets determined from the orthogonal network policy set 220. The orthogonal policy reduction engine 110 may nonetheless make such a selection because the particular reduced orthogonal network policy set may yield better performance (e.g., throughput, speed, etc.) despite having a greater number of table entries to implement or dataflows to match for. Such a scenario may occur when the orthogonal policy reduction engine 110 selects a particular reduced orthogonal network policy set with a wildcard value for a dimension that a higher-performance table (e.g., a TCAM) has a wildcard processing capability for, but translates into a greater number of table entries or dataflows to match for than another reduced orthogonal network policy set (e.g., which has a wildcard value for a dimension that the higher-performance table does not support a wildcard processing capability for).

Put another way, the orthogonal policy reduction engine 110 may select a particular reduced orthogonal network policy set even when a different reduced orthogonal network policy set translates into a lesser number of protocol-specific messages than the particular reduced orthogonal network policy set. The orthogonal policy reduction engine 110 may do so because the target switching device includes a particular table that processes the particular reduced orthogonal network policy set at a greater speed than the different reduced orthogonal network policy set. In this example, the particular table (e.g., a high-performance table) may include a wildcard processing capability for a particular match field of the particular reduced orthogonal network policy set but not a wildcard processing capability of a different match field of the different reduced orthogonal network policy set.

As yet another example, the orthogonal policy reduction engine 110 may select a particular reduced orthogonal network policy set accounting for a combination of actions that a table in the target switching device supports. In the context of the concrete illustration involving network policies P1 and P2, the orthogonal policy reduction engine 110 may select a particular reduced orthogonal network policy set that includes a greater number of entries that can be implemented in a table that supports both "log" and "inspect" actions, which may thus reduce the number of table entries that may be duplicated into both a first table to perform the "log" action and a second table to perform the "inspect" action. In that regard, the orthogonal network reduction engine 110 may account for the richness (e.g., degree of combinations) of actions supported by tables of the target switching device.

While some examples of switching device characteristics and other selection factors have been presented above, the orthogonal policy reduction engine 110 may select the particular reduced orthogonal network policy set to implement on the target switching device in any number of ways. The orthogonal policy reduction engine 110 may account for any combination of the factors described above, and in some examples weights different characteristics according to configurable or user-specified weights.

As described above, the orthogonal policy reduction engine 110 may account for various factors in selecting a reduced orthogonal network policy set to implement in a target switching device. The orthogonal policy reduction engine 110 may also apply multiple iterations or instances of orthogonal policy combinations to determine the reduced orthogonal network policy sets to select from. Some of these features are illustrated next in the context of the continuing concrete illustration involving network policies P1 and P2.

In particular, three different sets of reductions on the orthogonal network policy set 220 that the orthogonal policy reduction engine 110 may perform are detailed. For each of the reductions, the orthogonal policy reduction engine 110 may start with the orthogonal network policy set 220 for the network policies P1 and P2, shown above in Table 4. The sets of reductions performed by the orthogonal policy reduction engine 110 in this illustration are referred to as reductions A, B, and C respectively.

For reduction A, the orthogonal policy reduction engine 110 may perform a first set of reductions by combining orthogonal network policies in the orthogonal network policy set 220 as shown in Table 5 below:

TABLE 5

First set of reductions for Reduction A

| Reference Number | Source | Destination | Classifier | Context | Action |
|---|---|---|---|---|---|
| #50 + #51 | !Contractor | Datacenter | !IP | * | Inspect |
| #53 + #54 | !Contractor | Datacenter | IP | * | Inspect |
| #63 | Contractor | !Datacenter | IP | 8am-5pm | Log |
| #77 + #78 | Contractor | Datacenter | !IP | * | Inspect |
| #80 | Contractor | Datacenter | IP | !(8am-5pm) | Inspect |
| #81 | Contractor | Datacenter | IP | 8am-5pm | Inspect + Log |

From the first set of reductions, the orthogonal policy reduction engine 110 may perform a second set of reductions by further combining the orthogonal network policies as shown in Table 6 below:

TABLE 6

Second set of reductions for Reduction A

| Reference Number | Source | Destination | Classifier | Context | Action |
|---|---|---|---|---|---|
| (#50 + #51) + (#53 + #54) | !Contractor | Datacenter | * | * | Inspect |
| #63 | Contractor | !Datacenter | IP | 8am-5pm | Log |
| #77 + #78 | Contractor | Datacenter | !IP | * | Inspect |
| #80 | Contractor | Datacenter | IP | !(8am-5pm) | Inspect |
| #81 | Contractor | Datacenter | IP | 8am-5pm | Inspect + Log |

After the second set of reductions shown in Table 6, the orthogonal policy reduction engine 110 may determine that no further reductions for reduction A are possible, and may thus identify the orthogonal network policies in Table 6 as the reduced orthogonal network policy set resulting from performing reduction A (referred to also as reduced orthogonal network policy set A in the context of this concrete illustration). Reduced orthogonal network policy set A may thus be implemented as (e.g., translated into) 5 table entries, with 2 table entries that are applied at all times by a target switching device (e.g., with a context dimension value of *), 2 table entries that is applied from 8 am-5 pm, and 1 entry that is applied outside of 8 am-5 pm. Thus, the reduced orthogonal network policy set A, when implemented, may require that at least 3 table entries be applied at any given point in time, with 4 table entries applied from 8 am-5 pm.

Turning to reduction B, the orthogonal policy reduction engine 110 may perform a first set of reductions by combining orthogonal network policies in the orthogonal network policy set 220 as shown in Table 7 below:

TABLE 7

First set of reductions for Reduction B

| Reference Number | Source | Destination | Classifier | Context | Action |
|---|---|---|---|---|---|
| #50 + #51 | !Contractor | Datacenter | !IP | * | Inspect |
| #53 + #54 | !Contractor | Datacenter | IP | * | Inspect |
| #63 | Contractor | !Datacenter | IP | 8am-5pm | Log |
| #77 + #80 | Contractor | Datacenter | * | !(8am-5pm) | Inspect |
| #78 | Contractor | Datacenter | !IP | 8am-5pm | Inspect |
| #81 | Contractor | Datacenter | IP | 8am-5pm | Inspect + Log |

Note that the first set of reductions for reductions A and B differ only in that reduction A combines policies #77 and #78 (with policy #80 not combined with another policy) whereas reduction B combines policies #77 and #80 (with policy #78 not combined instead). From the first set of reductions for reduction B, the orthogonal policy reduction engine 110 may perform a second set of reductions by further combining the orthogonal network policies as shown in Table 8 below:

TABLE 8

Second set of reductions for Reduction B

| Reference Number | Source | Destination | Classifier | Context | Action |
|---|---|---|---|---|---|
| (#50 + #51) + (#53 + #54) | !Contractor | Datacenter | * | * | Inspect |
| #63 | Contractor | !Datacenter | IP | 8am-5pm | Log |
| #77 + #80 | Contractor | Datacenter | * | !(8am-5pm) | Inspect |
| #78 | Contractor | Datacenter | !IP | 8am-5pm | Inspect |
| #81 | Contractor | Datacenter | IP | 8am-5pm | Inspect + Log |

After the second set of reductions shown in Table 8, the orthogonal policy reduction engine 110 may determine that no further reductions for reduction B are possible, and may thus identify the orthogonal network policies in Table 8 as the reduced orthogonal network policy set that results from performing reduction B (referred to also as reduced orthogonal network policy set B in the context of this concrete illustration). Reduced orthogonal network policy set B may thus be implemented as (e.g., translated into) 5 table entries, with 1 entry that is applied at all times by a target switching device (e.g., with a context dimension value of *), 3 entries that are applied from 8 am-5 pm, and 1 entry that is applied outside of 8 am-5 pm. Thus, the reduced orthogonal network policy set B, when implemented, may require that at least 2 table entries be applied at any given point in time, with 4 table entries being applied from 8 am-5 pm.

Next, regarding reduction C, the orthogonal policy reduction engine 110 may perform a first set of reductions by combining orthogonal network policies in the orthogonal network policy set 220 as shown in Table 9 below:

TABLE 9

First set of reductions for Reduction C

| Reference Number | Source | Destination | Classifier | Context | Action |
|---|---|---|---|---|---|
| #50 + #77 | * | Datacenter | !IP | !(8am-5pm) | Inspect |
| #51 + #78 | * | Datacenter | !IP | 8am-5pm | Inspect |
| #53 + #80 | * | Datacenter | IP | !(8am-5pm) | Inspect |
| #54 | !Contractor | Datacenter | IP | 8am-5pm | Inspect |
| #63 | Contractor | !Datacenter | IP | 8am-5pm | Log |
| #81 | Contractor | Datacenter | IP | 8am-5pm | Inspect + Log |

Note that for reduction C, the orthogonal policy reduction engine 110 does not perform the policy combinations of (i) #77 and #78 or (ii) #77 and #80 that are performed for reductions A and B respectively. Instead, the orthogonal policy reduction engine 110 combines the network polices of the orthogonal network policy set 220 in a different way, while nonetheless representing the network policies P1 and P2. From the first set of reductions for reduction C, the orthogonal policy reduction engine 110 may perform a second set of reductions by further combining the orthogonal network policies as shown in Table 10 below:

TABLE 10

Second set of reductions for Reduction C

| Reference Number | Source | Destination | Classifier | Context | Action |
|---|---|---|---|---|---|
| (#50 + #77) + (#51 + #78) | * | Datacenter | !IP | * | Inspect |
| #53 + #80 | * | Datacenter | IP | !(8am-5pm) | Inspect |
| #54 | !Contractor | Datacenter | IP | 8am-5pm | Inspect |
| #63 | Contractor | !Datacenter | IP | 8am-5pm | Log |
| #81 | Contractor | Datacenter | IP | 8am-5pm | Inspect + Log |

After the second set of reductions shown in Table 10, the orthogonal policy reduction engine 110 may determine that no further reductions for reduction C are possible, and may thus identify the orthogonal network policies in Table 10 as the reduced orthogonal network policy set that results from performing reduction C (referred to also as reduced orthogonal network policy set C in the context of this concrete illustration). Reduced orthogonal network policy set C may thus be implemented as (e.g., translated into) 5 table entries, with 1 entry that is applied at all times by a target switching device (e.g., with a context dimension value of *), 3 entries that are applied from 8 am-5 pm, and 1 entry that is applied outside of 8 am-5 pm. Thus, the reduced orthogonal network policy set C, when implemented, may require that at least 2 table entries be applied at any given point in time, with 4 table entries being applied from 8 am-5 pm.

The orthogonal policy reduction engine 110 may select among the reduced orthogonal network policy sets A, B, and C to implement on a target switching device. As noted above, the orthogonal policy reduction engine 110 may account for the number of dataflows to match for or the number of table entries to implement in evaluating the various reduced orthogonal network policy sets. For a company with $N_C$ number of contractor endpoints, $N_D$ number of datacenter endpoints and $N_T$ total number of endpoints, the orthogonal policy reduction engine 110 may determine the reduced orthogonal network policy sets A, B, and C produce the following number of dataflows to match for, as shown in Tables 11, 12, and 13 respectively:

TABLE 11

Number of dataflows to match for
Reduced Orthogonal Network Policy Set A

| Reference Number | Number of Dataflows | Context |
|---|---|---|
| (#50 + #51) + (#53 + #54) | $(N_T - N_C) \times N_D$ | * |
| #63 | $N_C \times (N_T - N_D)$ | 8am-5pm |
| #77 + #78 | $N_C \times N_D$ | * |
| #80 | $N_C \times N_D$ | !(8am-5pm) |
| #81 | $N_C \times N_D$ | 8am-5pm |
| TOTAL | $((N_T - N_C) \times N_D) + (N_C \times (N_T - N_D)) + 2(N_C \times N_D)$ | 8am-5pm |
| TOTAL | $((N_T - N_C) \times N_D) + 2(N_C \times N_D)$ | !(8am-5pm) |

TABLE 12

Number of dataflows to match for Reduced
Orthogonal Network Policy Set B

| Reference Number | Number of Dataflows | Context |
|---|---|---|
| (#50 + #51) + (#53 + #54) | $(N_T - N_C) \times N_D$ | * |
| #63 | $N_C \times (N_T - N_D)$ | 8am-5pm |
| #77 + #80 | $N_C \times N_D$ | !(8am-5pm) |
| #78 | $N_C \times N_D$ | 8am-5pm |
| #81 | $N_C \times N_D$ | 8am-5pm |
| TOTAL | $((N_T - N_C) \times N_D) + (N_C \times (N_T - N_D)) + 2(N_C \times N_D)$ | 8am-5pm |
| TOTAL | $((N_T - N_C) \times N_D) + (N_C \times N_D)$ | !(8am-5pm) |

TABLE 13

Number of dataflows to match for Reduced
Orthogonal Network Policy Set C

| Reference Number | Number of Dataflows | Context |
|---|---|---|
| (#50 + #77) + (#51 + #78) | $N_D$ | * |
| #53 + #80 | $N_D$ | !(8am-5pm) |
| #54 | $(N_T - N_C) \times N_D$ | 8am-5pm |
| #63 | $N_C \times (N_T - N_D)$ | 8am-5pm |
| #81 | $N_C \times N_D$ | 8am-5pm |
| TOTAL | $((N_T - N_C) \times N_D) + (N_D \times (N_T - N_D)) + N_D + N_C \times N_D$ | 8am-5pm |
| TOTAL | $2 N_D$ | !(8am-5pm) |

To evaluate the reduced orthogonal network policy sets A, B, and C for selection, the orthogonal policy reduction engine 110 may identify or refer to specific elements of a communication network, such as making the selection in reference to a specific set of endpoint devices in the communication network. In particular, the orthogonal policy reduction engine 110 may track or identify the number of particular network elements in the communication network. To illustrate with definite numbers, a sample communication network may include 10 contractor endpoints, 5 datacenter endpoints, and 100 total endpoints. In this scenario, the orthogonal policy reduction engine 110 may determine the specific number of dataflows that the reduced orthogonal network policy sets match for during the 8 am-5 pm timeframe and outside of the 8 am-5 pm timeframe, as shown in Tables 14 and 15 below:

TABLE 14

Number of Dataflows to match for Reductions
A, B, and C during 8am-5pm

| Reduction | Formula | Number of Dataflows | Savings |
|---|---|---|---|
| A | $((N_T - N_C) \times N_D) + (N_C \times (N_T - N_D)) + 2(N_C \times N_D)$ | 1500 | — |
| B | $((N_T - N_C) \times N_D) + (N_C \times (N_T - N_D)) + 2(N_C \times N_D)$ | 1500 | 0 |
| C | $((N_T - N_C) \times N_D) + (N_C \times (N_T - N_D)) + N_D + N_C \times N_D$ | 1455 | 45 (3% better) |

TABLE 15

Number of Dataflows to match for Reductions
A, B, and C outside of 8am-5pm

| Reduction | Formula | Number of Dataflows | Savings |
|---|---|---|---|
| A | $((N_T - N_C) \times N_D) + 2(N_C \times N_D)$ | 550 | — |
| B | $((N_T - N_C) \times N_D) + (N_C \times N_D)$ | 500 | −50 (9% better) |
| C | $2 N_D$ | 10 | 540 (5500% better) |

In Tables 14 and 15 above, a savings comparison with reference to Reduction A is also shown. Thus, in this example, the orthogonal policy reduction engine 110 may select the reduced orthogonal network policy set C to implement on a target switching device, as doing so may result in the least number of dataflows to match for or least number of table entries to implement on the target switching device. In this example, the number of dataflows and savings comparison are determined assuming that the target switching device includes a wildcard processing capability for the various wildcard dimension values in the policies of the reduced orthogonal network policy sets A, B, and C. When the target switching device includes wildcard processing capabilities for some, but not all, dimension values of network policies in the reduced orthogonal network policy sets A, B, and C, the orthogonal policy reduction engine 110 may determine the number of dataflows to match for differently, and may select a different reduced orthogonal network policy set to implement on the target switching device.

In some examples, the orthogonal policy reduction engine 110 may precompute calculations to measure the number of table entries or dataflows to match for, and do so prior to referencing a particular set of intent-based network policies or orthogonal network policy set 220. To explain further, the orthogonal policy reduction engine 110 may recognize that for a set of intent-based network policies, there are a certain set of combinations according to whether the dimension values for each dimension are specified or not (and when not, may take the form of a unspecified or wildcard value). As an illustration, the source dimension of intent-based network policies P1 and P2 may be categorized according to one of the following combinations:

| Source$_{P1}$ | Source$_{P2}$ |
|---|---|
| * | * |
| * | Specified |
| Specified | * |
| Specified | Specified |

The combinations above thus include when (i) when both the source dimension value of intent-based network policy P1 and the source dimension value of intent-based network policy P2 are unspecified (e.g., any or wildcard); (ii) when the source dimension value of intent-based network policy P1 is unspecified and the source dimension value of intent-based network policy P2 is specified (e.g., "all contractors", "with a source address of 192.168.25.*", etc.); (iii) when the source dimension value of intent-based network policy P1 is specified and the source dimension value of intent-based network policy P2 is unspecified; and (iv) when both the source dimension value of intent-based network policy P1 and the source dimension value of intent-based network policy P2 are specified.

In this example, the orthogonal policy reduction engine 110 may identify a total set of dimension combinations, which may vary based on the number of dimensions included in the intent-based network policies. When network policies P1 and P2 are 4-dimensional (e.g., source, destination, classifier, and context), the orthogonal policy reduction engine 110 may identify 256 dimension combinations (e.g., $4^4$ number). For each dimension combination in the total set of dimension combinations, the orthogonal policy reduction engine 110 may determine the orthogonal network policy set 220 and multiple reduced orthogonal network policy sets, which may vary according to which dimension values of the particular dimension combination include a wildcard value. The orthogonal policy reduction engine 110 may do so, as a wildcard value for a particular dimension may result in a "none" or "never" value for various possible orthogonal network policies, allowing the orthogonal policy reduction engine 110 to prune such orthogonal network policies from the orthogonal policy set 220.

To illustrate, one of the dimension combinations that the orthogonal policy reduction engine 110 may identify is as follows:

Intent-Based Network Policy A:

| Source$_A$ | Destination$_A$ | Classifier$_A$ | Context$_A$ | Action |
|---|---|---|---|---|
| * | Specified | * | * | Action$_A$ |

Intent-Based Network Policy B:

| Source$_B$ | Destination$_B$ | Classifier$_B$ | Context$_B$ | Action |
|---|---|---|---|---|
| Specified | * | Specified | Specified | Action$_B$ |

Note that the above dimension combination corresponds to the intent-based network policies P1 and P2 in the concrete illustration presented above, and the orthogonal policy reduction engine 110 may determine this dimension combination even before receiving the actual intent-based network policies P1 and P2 from applications of a communication network.

As the logical inverse and combinations of a wildcard value may result in "none" or "never" values, the orthogonal policy reduction engine 110 (or conflict resolution engine 108) may determine the orthogonal network policy set 220 for each dimension combination. That is, even prior to receiving the intent-based network policies P1 and P2, the orthogonal policy reduction engine 110 may determine the orthogonal network policy set 220 that would apply to intent-based network policies P1 and P2, e.g., among the orthogonal network policy sets 220 applicable to each of the 256 dimension combinations. The orthogonal policy reduction engine 110 may do so based on the specific dimensions of each dimension combination that include the wildcard value.

For the example dimension combination for intent-based network policies A and B specified above (which intent-based network policies P1 and P2 correspond to), the orthogonal policy reduction engine 110 may precompute the following orthogonal network policies from possible valid orthogonal network policies as shown in Table 16:

TABLE 16

Precomputed Orthogonal Network Policies for an Example Dimension Combination

| Reference Number | Source | Destination | Classifier | Context | Action |
|---|---|---|---|---|---|
| #1 | None | !Destination$_A$ | None | Never | Action$_B$ |
| #3 | None | !Destination$_A$ | None | Context$_B$ | Action$_B$ |
| #7 | None | !Destination$_A$ | Classifier$_B$ | Never | Action$_B$ |
| #9 | None | !Destination$_A$ | Classifier$_B$ | Context$_B$ | Action$_B$ |
| #19 | None | Destination$_A$ | None | Never | Action$_B$ |
| #21 | None | Destination$_A$ | None | Context$_B$ | Action$_B$ |
| #25 | None | Destination$_A$ | Classifier$_B$ | Never | Action$_B$ |
| #27 | None | Destination$_A$ | Classifier$_B$ | Context$_B$ | Action$_B$ |
| #41 | !Source$_B$ | None | !Classifier$_B$ | !Context$_B$ | Action$_A$ |
| #42 | !Source$_B$ | None | !Classifier$_B$ | Context$_B$ | Action$_A$ |
| #44 | !Source$_B$ | None | Classifier$_B$ | !Context$_B$ | Action$_A$ |
| #45 | !Source$_B$ | None | Classifier$_B$ | Context$_B$ | Action$_A$ |
| #50 | !Source$_B$ | Destination$_A$ | !Classifier$_B$ | !Context$_B$ | Action$_A$ |
| #51 | !Source$_B$ | Destination$_A$ | !Classifier$_B$ | Context$_B$ | Action$_A$ |
| #53 | !Source$_B$ | Destination$_A$ | Classifier$_B$ | !Context$_B$ | Action$_A$ |
| #54 | !Source$_B$ | Destination$_A$ | Classifier$_B$ | Context$_B$ | Action$_A$ |
| #55 | Source$_B$ | !Destination$_A$ | None | Never | Action$_B$ |
| #57 | Source$_B$ | !Destination$_A$ | None | Context$_B$ | Action$_B$ |
| #61 | Source$_B$ | !Destination$_A$ | Classifier$_B$ | Never | Action$_B$ |
| #63 | Source$_B$ | !Destination$_A$ | Classifier$_B$ | Context$_B$ | Action$_B$ |
| #68 | Source$_B$ | None | !Classifier$_B$ | !Context$_B$ | Action$_A$ |
| #69 | Source$_B$ | None | !Classifier$_B$ | Context$_B$ | Action$_A$ |
| #71 | Source$_B$ | None | Classifier$_B$ | !Context$_B$ | Action$_A$ |
| #72 | Source$_B$ | None | Classifier$_B$ | Context$_B$ | Action$_A$ |
| #73 | Source$_B$ | Destination$_A$ | None | Never | Action$_B$ |
| #75 | Source$_B$ | Destination$_A$ | None | Context$_B$ | Action$_B$ |
| #77 | Source$_B$ | Destination$_A$ | !Classifier$_B$ | !Context$_B$ | Action$_A$ |
| #78 | Source$_B$ | Destination$_A$ | !Classifier$_B$ | Context$_B$ | Action$_A$ |
| #79 | Source$_B$ | Destination$_A$ | Classifier$_B$ | Never | Action$_B$ |
| #80 | Source$_B$ | Destination$_A$ | Classifier$_B$ | !Context$_B$ | Action$_A$ |
| #81 | Source$_B$ | Destination$_A$ | Classifier$_B$ | Context$_B$ | Action$_A$ + Action$_B$ |

From the precomputed orthogonal network policies for a particular dimension combination, the orthogonal policy reduction engine 110 may prune any orthogonal network polices that include a "never" or "none" dimension value, which may yield the orthogonal network policy 220 for the dimension combination specified according to logical dimension values (e.g., Source$_B$ or Destination$_A$). In the example above, the orthogonal policy reduction engine 110 may prune policies #1, #3, #7, #9, #19, #21, #25, #27, #41, #42, #44, #45, #55, #57, #61, #68, #69, #71, #72, #73, #75, and #79. When the orthogonal policy reduction engine 110 receives intent-based network policies that match this particular dimension combination, the orthogonal policy reduction engine 110 (or conflict engine 108) may determine the orthogonal network policy set 220 by replacing the logical dimension values with the concrete values of the policies (e.g., replace $Source_B$ with "Contractors" or replace $Destination_A$ with "Datacenter").

For each dimension combination, the orthogonal policy reduction engine 110 may further perform various reductions to the orthogonal network policy set 220 expressed with logical values. The orthogonal policy reduction engine 110 may precompute the reductions, even prior to receiving actual intent-based network policies. As an example using the particular dimension combination above, the orthogonal policy reduction engine 110 may determine reductions to the orthogonal network policy set 220 expressed with logical values in a consistent manner as described above for reductions A, B, and C, using logical values instead of concrete policy values. Similar to reduction C described above, the orthogonal policy reduction engine 110 may precompute the following reduced orthogonal network policy set for the particular dimension combination, as shown in Table 17:

TABLE 17

Precomputed reduced orthogonal network policy set for example dimension combination

| Reference Number | Source | Destination | Classifier | Context | Action |
|---|---|---|---|---|---|
| (#50 + #77) + (#51 + #78) | * | $Destination_A$ | $!Classifier_B$ | * | $Action_A$ |
| #53 + #80 | * | $Destination_A$ | $Classifier_B$ | $!Context_B$ | $Action_A$ |
| #54 | $!Source_B$ | $Destination_A$ | $Classifier_B$ | $Context_B$ | $Action_A$ |
| #63 | $Source_B$ | $! Destination_A$ | $Classifier_B$ | $Context_B$ | $Action_B$ |
| #81 | $Source_B$ | $Destination_A$ | $Classifier_B$ | $Context_B$ | $Action_A$ + $Action_B$ |

The orthogonal policy reduction engine 110 may thus determine multiple reduced orthogonal network policy sets expressed with logical values, and do so for each dimension combination.

Along similar lines, the orthogonal policy reduction engine 110 may precompute a logical expression indicative of a number of dataflows to match for or table entries to implement from the determined reduced orthogonal network policy sets. For instance, the orthogonal network policy reduction engine 110 may include numerical indicators in the logical expression that indicate a logical, as opposed to a concrete, numerical value. The numerical indicators may represent a number of endpoints in a communication network, such as a particular class, type, or set of endpoints. Continuing the particular dimension combination example above, the orthogonal policy reduction engine 110 may precompute the logical expression for the reduced orthogonal network policy set shown in Table 17 as the following, as shown in Table 18 below:

TABLE 18

Precomputed logical expression for example dimension combination

| Reference Number | Number of Dataflows | Context |
|---|---|---|
| (#50 + #77) + (#51 + #78) | $N_{DestinationA}$ | * |
| #53 + #80 | $N_{DestinationA}$ | $!Context_B$ |
| #54 | $(N_{TOTAL} - N_{SourceB}) \times N_{DestinationA}$ | $Context_B$ |
| #63 | $N_{SourceB} \times (N_{TOTAL} - N_{DestinationA})$ | $Context_B$ |
| #81 | $N_{SourceB} \times N_{DestinationA}$ | $Context_B$ |
| TOTAL | $((N_{TOTAL} - N_{SourceB}) \times N_{DestinationA}) +$ $(N_{SourceB} \times (N_{TOTAL} - N_{DestinationA})) +$ $N_{DestinationA} +$ $N_{C2} \times N_{DestinationA}$ | $Context_B$ |
| TOTAL | $2\,N_{DestinationA}$ | $!Context_B$ |

In the example above in Table 18, the numerical indicator $N_{Total}$ may represent the total number of endpoints in a communication network, the numerical indicator $N_{DestinationA}$ may represent the number of endpoints matching the destination dimension value of intent-based network policy A, and the numerical indicator $N_{SourceB}$ may represent the number of endpoints matching the source dimension value of intent-based network policy B. Thus, for each dimension combination, the orthogonal policy reduction engine 110 may precompute an orthogonal network policy set 220, multiple reduced orthogonal network policy sets, and logical expressions with numerical indicators the multiple reduced orthogonal policy sets.

Once a set of intent-based network policies is received, the orthogonal policy reduction engine 110 may determine the specific dimension values of the intent-based policies, identify the particular dimension combination the received intent-based policies correspond to, and retrieve and populate (with concrete values) the orthogonal network policy set 220, reduced orthogonal network policy sets, the logical expressions, or any combination thereof. Accordingly, the orthogonal policy reduction engine 110 may compute the number of dataflows to match for or table entries to implement according to the concrete numerical values of the precomputed numerical indicators. Then, the orthogonal policy reduction engine 110 may select a particular reduced orthogonal network policy set for implementation on a target switching device, for example based on replacing the precomputed numerical indicators with concrete values.

By precomputing the dimension combinations and precomputing, for each dimension combination, the orthogonal network policy set 220 (expressed with logical values), reduced orthogonal network policy sets (also expressed with logical values), and logical expressions with numerical indicators, the orthogonal policy reduction engine 110 may increase the speed and efficiency by which a particular reduced orthogonal network policy set is selected for implementation.

In some instances, the precomputed reduced orthogonal network policy sets may assume that a target switching device includes a wildcard processing capability for some or all of the dimensions of a network policy. When the target switching device does not include a wildcard processing capability for a dimension in the precomputed reduced orthogonal network policy sets with a wildcard value, the orthogonal policy reduction engine 110 may determine not to use the precomputed logical expressions to compare the number of dataflows to match for or table entries to implement among the multiple reduced orthogonal network policy sets.

As described above, the orthogonal policy reduction engine 110 may select a particular reduced orthogonal network policy set to implement on a target switching device (e.g., transmit to a target switching device in a protocol-specific format) based on a characteristic of the target switching device itself. In doing so, the orthogonal policy reduction engine 110 may select a particular reduced orthogonal network policy set that the target switching device may more efficiently or quickly effectuate, which may result in increased network throughput and increased communication speeds. Moreover, the reduced orthogonal network policy set selection features may support increased flexibility for different types of switching devices, allowing a SDN controller or other management entity to manage switching functions of a communication network with greater flexibility, efficiency, and effectiveness.

Figure 3:
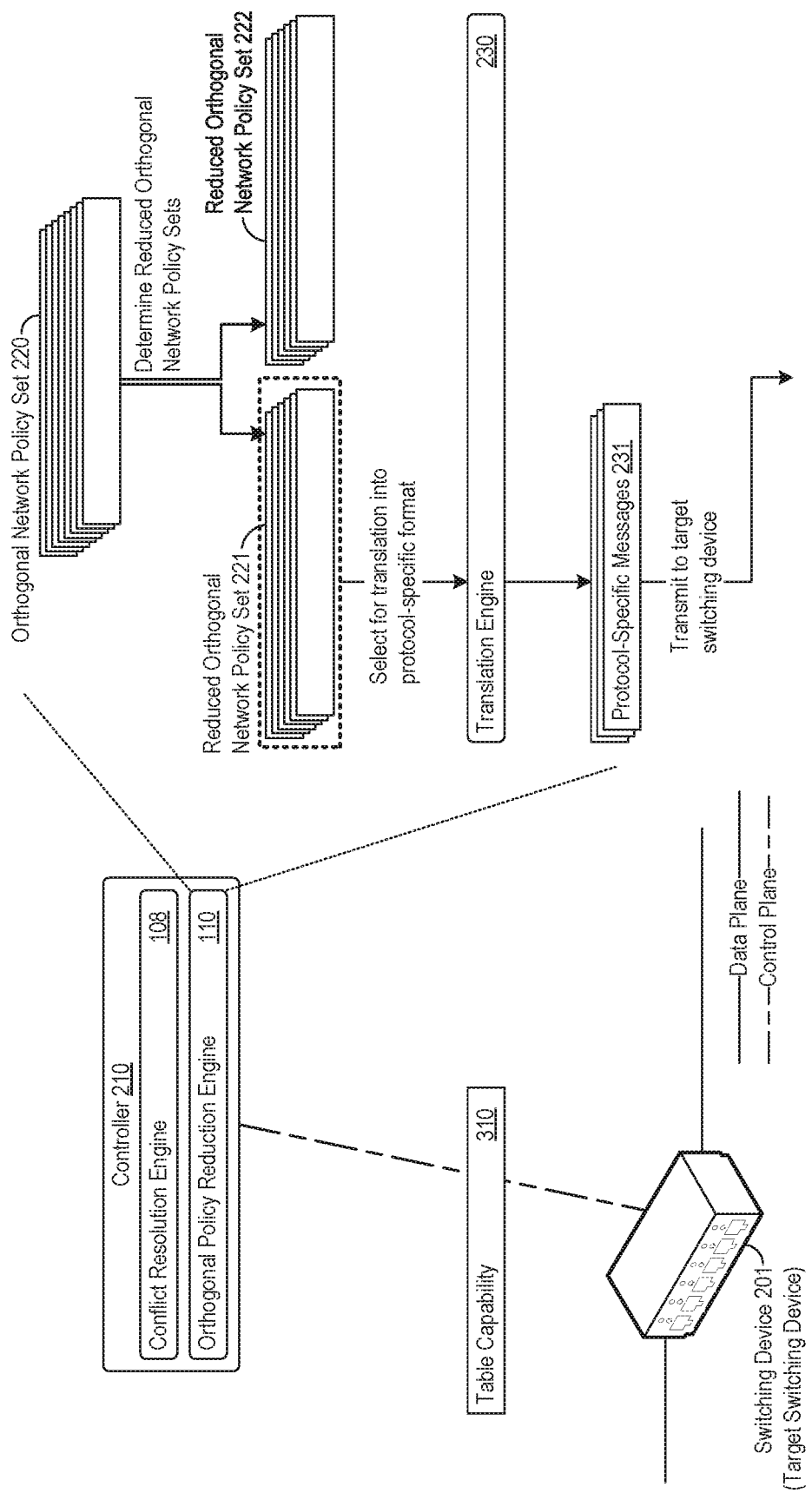
FIG. 3 shows another example selection of a reduced orthogonal network policy set by the orthogonal policy reduction engine.

FIG. 3 shows another example selection of a reduced orthogonal network policy set by the orthogonal policy reduction engine 110. In the example shown in FIG. 3, the orthogonal policy reduction engine 110 selects a particular reduced orthogonal network policy set for transmission to a target switching device prior to policy translation. In doing so, the orthogonal policy reduction engine 110 may utilize previously-identified characteristics of the target switching device to select the particular reduced orthogonal network policy set for translation into a protocol-specific format and transmission to the target switching device.

The orthogonal policy reduction engine 110 may identify device characteristics of a target switching device in various ways. In some examples, the controller 210 receives capability communications from various switching devices managed by the controller 210. A capability communication may indicate particular switching characteristics provided by a switching device, including packet processing capabilities, wildcard processing capabilities (e.g., specific packet fields or match fields that the switching device can wildcard), or table capabilities, including a number of tables implemented by the target switching device, a table size of a table implemented by the target switching device, a number of actions supported by the table implemented by the target switching device, a particular action that the table implemented by the target switching device implements with increased efficiency, or any combination thereof. In the example shown in FIG. 3, the switching device 201 sends a table capability communication 310, which may indicate to the controller 210 a switching device characteristic of the switching device 201 (including any of the characteristics described above).

Using the previously-identified characteristic of a target switching device (e.g., the switching device 201), the orthogonal policy reduction engine 110 may select a particular reduced orthogonal policy network set from among multiple reduced orthogonal network policy sets, consistently as described herein in accounting for characteristics of the target switching device. That is, the orthogonal policy reduction engine 110 may select a particular reduced orthogonal network policy set for translation and transmission that the target switching device can more efficiently process, whether based on a wildcard processing capability for a particular match field, a particular table or action that the target switching device can process more efficiently, or according to any other factor or combination of factors. As seen in FIG. 3, the orthogonal policy reduction engine 110 selects the reduced orthogonal network policy set 221 for translation into the protocol-specific format by the translation engine 230 and for transmission of the protocol-specific messages 231 to the target switching device, which the switching device 201 may implement more efficiently or effectively than had the orthogonal policy reduction engine 110 selected the reduced orthogonal network policy set 222 for translation.

While the examples in FIGS. 2 and 3 above depict a single switching device, the controller 210 may manage communication networks with multiple switching devices with differing characteristics, capabilities, resource availability, network bandwidth, and the like. The orthogonal policy reduction engine 110 may select a reduced orthogonal network policy set to transmit to some or all of the managed switching devices, and perform such a selection individually for each different switching device. Some of these features are described in greater detail next in FIG. 4.

Figure 4:
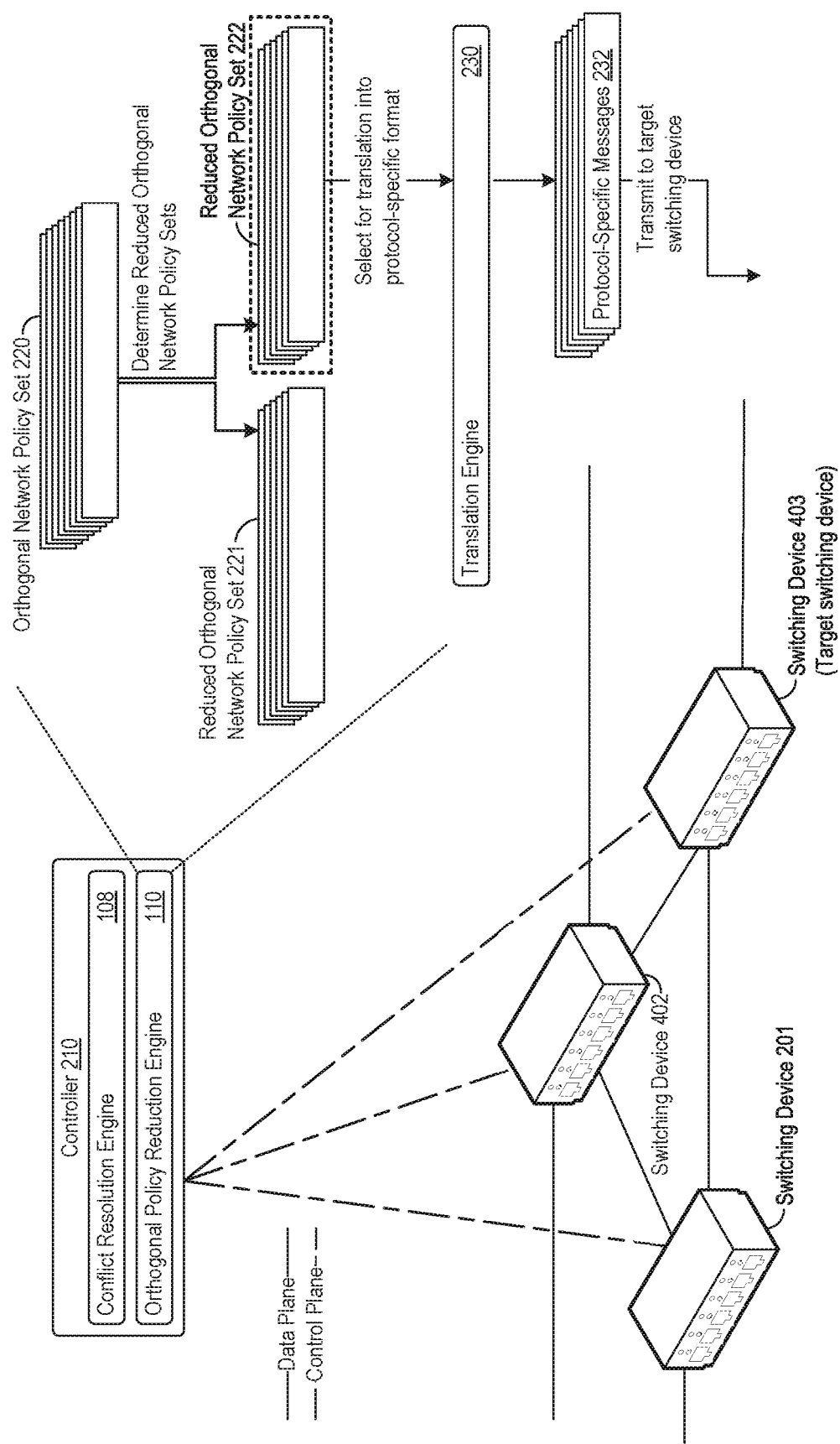
FIG. 4 shows an example of reduced orthogonal network policy set selections for different switching devices.

FIG. 4 shows an example of reduced orthogonal network policy set selections for different switching devices. In FIG. 4, the controller 210 manages the switching device 201 (continuing the examples from FIGS. 2 and 3), the switching device 402, and the switching device 403. The switching devices 201, 402, and 403 may have differing switching characteristics, e.g., differing table capabilities. Thus, a particular reduced orthogonal network policy set may be more efficiently effectuated on the switching device 201, but not the switching devices 402 and 403 and a different reduced orthogonal network policy set may be more efficiently effectuated on the switching device 403, but not the switching devices 201 and 402. The orthogonal policy reduction engine 110 may select a particular reduced orthogonal network policy set to transmit to the switching devices 201, 402, and 403 respectively, and based on the respective characteristics of the switching devices.

In FIG. 4, the orthogonal policy reduction engine 110 transmits the protocol-specific messages 231 to the switching device 201 (e.g., as described above, translated from the reduced orthogonal network policy set 221). For the switching device 403, the orthogonal policy selection engine 110 selects a different reduced orthogonal network policy set. That is, when the switching device 403 is the target switching device, the orthogonal policy reduction engine 110 may select the reduced orthogonal network policy set 222 for translation based on characteristics of the switching device 403, e.g., based on the switching device 403 including a wildcard processing capability for a match field with a wildcard value in the reduced orthogonal network policy set 222 but not including a wildcard processing capability for a different match field with a wildcard value in the reduced orthogonal network policy set 221. In this example, the orthogonal policy reduction engine 110 passes the reduced orthogonal network policy set 222 to the translation engine 230 for translation into the protocol-specific messages 232, which the controller 210 may transmit to the switching device 403 to implement.

Thus, the orthogonal policy reduction engine 110 may select different reduced orthogonal network policy sets for different switching devices, which may leverage the specific capabilities of the different switching devices. The reduced orthogonal network policy set selection may thus flexibly provide device-specific increases in processing efficiency as different switching devices vary in capability, hardware, and bandwidth.

Figure 5:
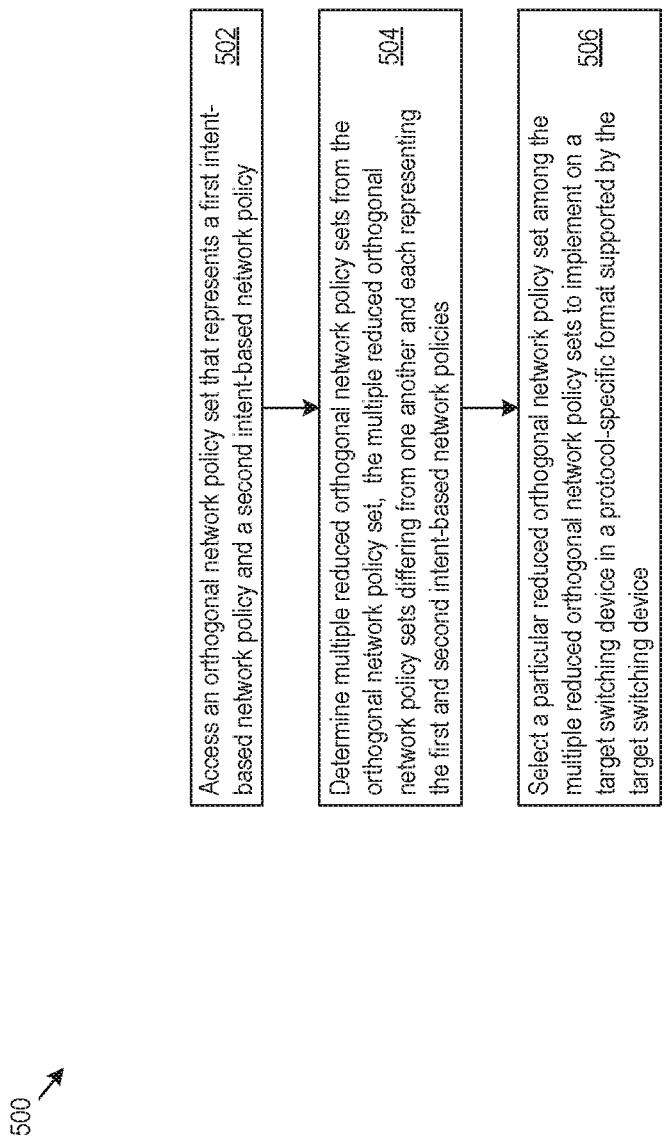
FIG. 5 shows an example of logic that a system or device may implement to support reduced orthogonal network policy set selection.

FIG. 5 shows an example of logic 500 that a system or device may implement to support reduced orthogonal network policy set selection. The system 100, for instance, may implement the logic 500 as hardware, executable instructions stored on a machine-readable medium, or as combinations thereof. In some examples, a system or network controller (e.g., the controller 210) implements the logic 500 via the orthogonal policy reduction engine 110, through which the system or network controller may perform the logic 500 as a method or process to select a particular reduced orthogonal network policy set for translation into a protocol-specific format for a target switching device.

The logic 500 includes accessing an orthogonal network policy set that represents a first intent-based network policy and a second intent-based network policy (502). The orthogonal network policy set may be derived by a conflict resolution engine 108, for example. The logic 500 also includes determining multiple reduced orthogonal network policy sets from the orthogonal network policy set (504). The multiple reduced orthogonal network policy sets may differ from one another, but each represent the first and second intent-based network policies. The logic 500 may further include selecting a particular reduced orthogonal network policy set among the multiple reduced orthogonal network policy sets to transmit to a target switching device in a protocol-specific format supported by the target switching device (506), including according to any of the selection features described herein.

In some examples, selecting the particular reduced orthogonal network policy set includes translating each of the multiple reduced orthogonal network policy sets into protocol-specific messages and determining that the protocol-specific messages translated from the particular reduced orthogonal network policy set has the least number of dataflows to match for from among the matching criteria translated from each of the multiple reduced orthogonal network policy sets. As another example, selecting of the particular reduced orthogonal network policy set may be based on a number of data values for a particular match field in the orthogonal network policy set.

As yet another example, the logic 500 may further include receiving an indication of a table capability from the target switching device and selecting the particular reduced orthogonal network policy based on the table capability. In this example, the table capability may include a wildcard processing capability for a particular match field in the orthogonal network policy set and selecting the particular reduced orthogonal network policy set may include determining that the particular reduced orthogonal network policy includes a wildcard value for the particular match field.

Regarding performance as a factor to account for in selecting the particular reduced orthogonal network policy set, the logic 500 may, in some examples, include selecting the particular reduced orthogonal network policy set even when a different reduced orthogonal network policy set translates into a lesser number of protocol-specific messages than the particular reduced orthogonal network policy set, but the target switching device includes a particular table that processes the particular reduced orthogonal network policy set at a greater speed than the different reduced orthogonal network policy set. In this example, the logic 500 may further include determining that the particular table of the target switching includes a wildcard processing capability for a particular match field of the particular reduced orthogonal network policy set but not a wildcard processing capability of a different match field of the different reduced orthogonal network policy set.

Figure 6:
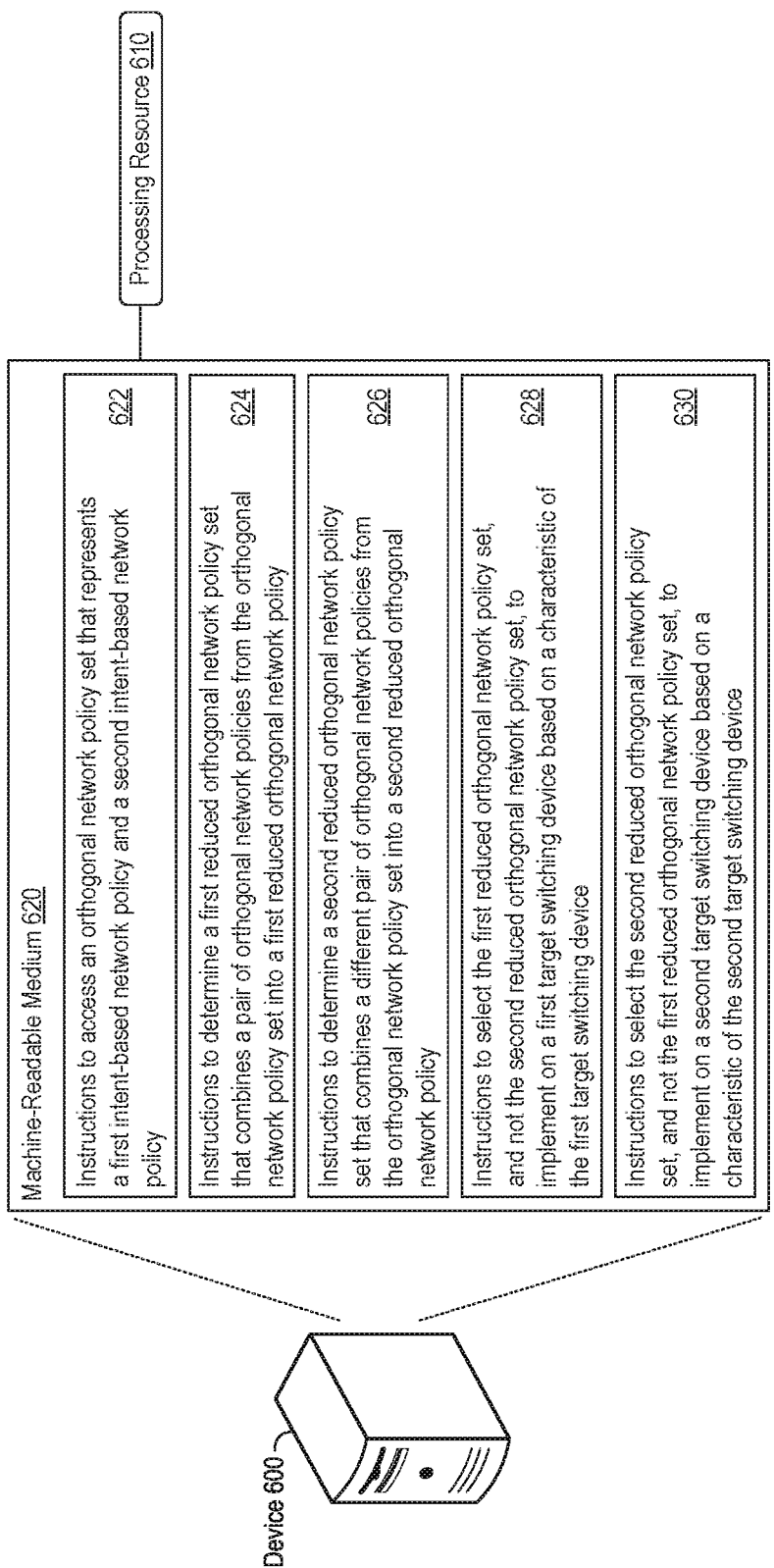
FIG. 6 shows an example of a device that supports reduced orthogonal network policy set selection.

FIG. 6 shows an example of a device 600 that supports reduced orthogonal network policy set selection. The device 600 may include a processing resource 610, which may take the form of a single or multiple processors. The processor(s) may include a central processing unit (CPU), microprocessor, or any hardware device suitable for executing instructions stored on a machine-readable medium, such as the machine-readable medium 620 shown in FIG. 6. The machine-readable medium 620 may take the form of any non-transitory electronic, magnetic, optical, or other physical storage device that stores executable instructions, such as the instructions 622, 624, 626, 628, and 630 shown in FIG. 6. As such, the machine-readable medium 620 may be, for example, Random Access Memory (RAM) such as dynamic RAM (DRAM), flash memory, memristor memory, spin-transfer torque memory, an Electrically-Erasable Programmable Read-Only Memory (EEPROM), a storage drive, an optical disk, and the like.

The device 600 may execute instructions stored on the machine-readable medium 620 through the processing resource 610. Executing the instructions may cause the device 600 to perform any of the features described herein, including according to any features of the orthogonal network policy reduction engine 110. For example, execution of the instructions 622, 624, 626, 628, and 630 by the processing resource 610 may cause the device 600 to access an orthogonal network policy set that represents a first intent-based network policy and a second intent-based network policy (instructions 622); determine a first reduced orthogonal network policy set that combines a pair of orthogonal network policies from the orthogonal network policy set into a first reduced orthogonal network policy (instructions 624); determine a second reduced orthogonal network policy set that combines a different pair of orthogonal network policies from the orthogonal network policy set into a second reduced orthogonal network policy (instructions 626); select the first reduced orthogonal network policy set, and not the second reduced orthogonal network policy set, for transmission to a first target switching device based on a characteristic of the first target switching device (e.g., for translation and transmission in a protocol-specific format) (instructions 628); and select the second reduced orthogonal network policy set, and not the first reduced orthogonal network policy set, for transmission to a second target switching device in the protocol-specific format based on a characteristic of the second target switching device (e.g., for translation and transmission in a protocol-specific format) (instructions 630).

In some examples, the first reduced orthogonal network policy may include a wildcard value for a particular match field of the first reduced orthogonal network policy and the instructions 628 may be executable by the processing resource 610 to select the first reduced orthogonal network policy set based on the first target switching device including a wildcard processing capability for the particular match field.

The systems, methods, devices, and logic described above, including the conflict resolution engine 108, orthogonal policy reduction engine 110, translation engine 220, and controller 210, may be implemented in many different ways in many different combinations of hardware, logic, circuitry, and executable instructions stored on a machine-readable medium. For example, the conflict resolution engine 108, orthogonal policy reduction engine 110, translation engine 220, controller 210, or any combination thereof, may include circuitry in a controller, a microprocessor, or an application specific integrated circuit (ASIC), or may be implemented with discrete logic or components, or a combination of other types of analog or digital circuitry, combined on a single integrated circuit or distributed among multiple integrated circuits. A product, such as a computer program product, may include a storage medium and machine readable instructions stored on the medium, which when executed in an endpoint, computer system, or other device, cause the device to perform operations according to any of the description above, including according to any features of the conflict resolution engine 108, orthogonal policy reduction engine 110, translation engine 220, controller 210, or any combination thereof.

The processing capability of the systems, devices, and engines described herein, including the conflict resolution engine 108, orthogonal policy reduction engine 110, translation engine 220, controller 210, or any combination thereof, may be distributed among multiple system components, such as among multiple processors and memories, optionally including multiple distributed processing systems. Parameters, databases, and other data structures may be separately stored and managed, may be incorporated into a single memory or database, may be logically and physically organized in many different ways, and may implemented in many ways, including data structures such as linked lists, hash tables, or implicit storage mechanisms. Programs may be parts (e.g., subroutines) of a single program, separate programs, distributed across several memories and processors, or implemented in many different ways, such as in a library (e.g., a shared library).

While various examples have been described above, many more implementations are possible.

The invention claimed is:

1. A system comprising:
a conflict resolution engine to derive an orthogonal network policy set that represents a first intent-based network policy and a second intent-based network policy; and
an orthogonal policy reduction engine to:
determine a first reduced orthogonal network policy set that combines a pair of orthogonal network policies from the orthogonal network policy set into a first reduced orthogonal network policy;
determine a second reduced orthogonal network policy set that combines a different pair of orthogonal network policies from the orthogonal network policy set into a second reduced orthogonal network policy;
select the first reduced orthogonal network policy set, and not the second reduced orthogonal network policy set, to implement on a target switching device based on a characteristic of the target switching device and further based on a table capability of the target switching device,
wherein the table capability of the target switching device comprises a number of tables implemented by the target switching device, a table size of a table implemented by the target switching device, a number, type, or combination of actions supported by the table implemented by the target switching device, a particular action that the table implemented by the target switching device implements with increased efficiency, or any combination thereof; and
transmit the first reduced orthogonal network policy set in a protocol-specific format supported by the target switching device.

2. The system of claim 1, wherein the first reduced orthogonal network policy includes a wildcard value for a particular match field of the first reduced orthogonal network policy; and
wherein the orthogonal policy reduction engine is to select the first reduced orthogonal network policy set based on the target switching device including a wildcard processing capability for the particular match field.

3. The system of claim 1, wherein the second reduced orthogonal network policy includes a wildcard value for a particular match field of the second reduced orthogonal network policy; and
wherein the orthogonal policy reduction engine is to select the first reduced orthogonal network policy set, and not the second reduced orthogonal network policy set, based on the target switching device not including a wildcard processing capability for the particular match field of the second reduced orthogonal network policy.

4. A method comprising:
accessing an orthogonal network policy set that represents a first intent-based network policy and a second intent-based network policy;
determining multiple reduced orthogonal network policy sets from the orthogonal network policy set, the multiple reduced orthogonal network policy sets differing from one another and each representing the first and second intent-based network policies;
selecting a particular reduced orthogonal network policy set among the multiple reduced orthogonal network policy sets to implement on a target switching device in a protocol-specific format supported by the target switching device based on a table capability of the target switching device,
wherein the table capability of the target switching device comprises a number of tables implemented by the target switching device, a table size of a table implemented by the target switching device, a number, type, or combination of actions supported by the table implemented by the target switching device, a particular action that the table implemented by the target switching device implements with increased efficiency, or any combination thereof; and
transmit the first reduced orthogonal network policy set in a protocol-specific format supported by the target switching device.

5. The method of claim 4, wherein selecting the particular reduced orthogonal network policy set comprises:
translating each of the multiple reduced orthogonal network policy sets into protocol-specific messages; and
determining that the protocol-specific messages translated from the particular reduced orthogonal network policy set has the least number of dataflows to match for from among protocol-specific messages translated from each of the multiple reduced orthogonal network policy sets.

6. The method of claim 4, further comprising receiving an indication of a table capability from the target switching device.

7. The method of claim 4, wherein the table capability comprises wildcard processing capability for a particular match field in the orthogonal network policy set; and
wherein selecting the particular reduced orthogonal network policy set comprises determining that the particular reduced orthogonal network policy includes a wildcard value for the particular match field.

8. The method of claim 4, wherein selecting comprises selecting the particular reduced orthogonal network policy set based on a number of data values for a particular match field in the orthogonal network policy set.

9. The method of claim 4, comprising selecting the particular reduced orthogonal network policy set even when a different reduced orthogonal network policy set translates into a lesser number of protocol-specific messages than the particular reduced orthogonal network policy set, but the target switching device includes a particular table that processes the particular reduced orthogonal network policy set at a greater speed than the different reduced orthogonal network policy set.

10. The method of claim 9, further comprising determining that the particular table of the target switching includes a wildcard processing capability for a particular match field of the particular reduced orthogonal network policy set but not a wildcard processing capability of a different match field of the different reduced orthogonal network policy set.

11. A non-transitory computer-readable medium comprising instructions executable by a processing resource to:
   access an orthogonal network policy set that represents a first intent-based network policy and a second intent-based network policy;
   determine a first reduced orthogonal network policy set that combines a pair of orthogonal network policies from the orthogonal network policy set into a first reduced orthogonal network policy;
   determine a second reduced orthogonal network policy set that combines a different pair of orthogonal network policies from the orthogonal network policy set into a second reduced orthogonal network policy;
   select the first reduced orthogonal network policy set, and not the second reduced orthogonal network policy set, to implement on a first target switching device based on a characteristic of the first target switching device and further based on a table capability of the first target switching device;
   select the second reduced orthogonal network policy set, and not the first reduced orthogonal network policy set, to implement on a second target switching device based on a characteristic of the second target switching device and further based on a table capability of the second target switching device,
   wherein a table capability of a respective target switching device comprises a number of tables implemented by the respective target switching device, a table size of a table implemented by the respective target switching device, a number, type, or combination of actions supported by the table implemented by the respective target switching device, a particular action that the table implemented by the respective target switching device implements with increased efficiency, or any combination thereof; and
   transmit the first or the second reduced orthogonal network policy set in a protocol-specific format supported by the first or the second target switching device.

12. The non-transitory computer-readable medium of claim 11, wherein the first reduced orthogonal network policy includes a wildcard value for a particular match field of the first reduced orthogonal network policy; and
   wherein the instructions are executable by the processing resource to select the first reduced orthogonal network policy set based on the first target switching device including a wildcard processing capability for the particular match field of the first reduced orthogonal network policy.

* * * * *